United States Patent
Skotheim et al.

(10) Patent No.: US 12,302,003 B2
(45) Date of Patent: May 13, 2025

(54) METHOD FOR DETERMINING ONE OR MORE GROUPS OF EXPOSURE SETTINGS TO USE IN A 3D IMAGE ACQUISITION PROCESS

(71) Applicant: Zivid AS, Oslo (NO)

(72) Inventors: Øystein Skotheim, Oslo (NO); Henrik Schumann-Olsen, Oslo (NO); Alexey Stepanov, Oslo (NO); Øyvind Janbu, Oslo (NO); Martin Ingvaldsen, Oslo (NO); Jens T. Thielemann, Oslo (NO)

(73) Assignee: Zivid AS, Oslo (NO)

( * ) Notice: Subject to any disclaimer, the term of this patent is extended or adjusted under 35 U.S.C. 154(b) by 199 days.

(21) Appl. No.: 17/620,933

(22) PCT Filed: Jun. 19, 2020

(86) PCT No.: PCT/EP2020/067244
§ 371 (c)(1),
(2) Date: Dec. 20, 2021

(87) PCT Pub. No.: WO2020/254657
PCT Pub. Date: Dec. 24, 2020

(65) Prior Publication Data
US 2022/0329716 A1    Oct. 13, 2022

(30) Foreign Application Priority Data
Jun. 21, 2019 (GB) ...................................... 1908935

(51) Int. Cl.
*H04N 13/254* (2018.01)
*H04N 13/296* (2018.01)
(Continued)

(52) U.S. Cl.
CPC ........... *H04N 23/72* (2023.01); *H04N 13/254* (2018.05); *H04N 13/296* (2018.05); *H04N 2013/0096* (2013.01)

(58) Field of Classification Search
CPC .... H04N 23/72; H04N 13/254; H04N 13/296; H04N 2013/0096
(Continued)

(56) References Cited

U.S. PATENT DOCUMENTS 7,940,311 B2   5/2011   Trimeche et al.
9,912,862 B2   3/2018   Peruch et al.
(Continued)

FOREIGN PATENT DOCUMENTS

CN   1758020 A    4/2006
CN   101816171 A   8/2010
(Continued)

OTHER PUBLICATIONS

PCT International Search Report and Written Opinion for corresponding PCT Application No. PCT/EP2020/067244, mailed on Sep. 2, 2020, 23 pages.
(Continued)

*Primary Examiner* — Albert Kir
(74) *Attorney, Agent, or Firm* — Dority & Manning, P.A.

(57) ABSTRACT

A method for determining one or more groups of exposure settings to use in a 3D image acquisition process carried out with an imaging system, the 3D image acquisition process comprising capturing one or more sets of image data on the image sensor using the respective groups of exposure settings, wherein the one or more sets of image data are such as to allow the generation of one or more 3D point clouds defining the three-dimensional coordinates of points on the surface(s) of one or more objects being imaged, each group of exposure settings specifying a value for one or more
(Continued)

parameters of the imaging system, wherein the method comprises identifying one or more candidate groups of exposure settings and selecting from the candidate groups of exposure settings, one or more groups of exposure settings that satisfy one or more optimization criteria.

14 Claims, 13 Drawing Sheets

(51) Int. Cl.
    *H04N 23/72*     (2023.01)
    *H04N 23/73*     (2023.01)
    *H04N 13/00*     (2018.01)

(58) Field of Classification Search
    USPC .......................................................... 348/47
    See application file for complete search history.

(56) References Cited

U.S. PATENT DOCUMENTS

| | | | |
|---|---|---|---|
| 10,190,873 B1* | 1/2019 | Yamagami | G01B 11/2545 |
| 11,145,076 B1* | 10/2021 | Horesh | H04N 23/61 |
| 2009/0022367 A1 | 1/2009 | Sasaki | |
| 2009/0185800 A1* | 7/2009 | Lee | G03B 7/003 |
| | | | 396/213 |
| 2013/0204594 A1* | 8/2013 | Liu | G03F 7/705 |
| | | | 703/2 |
| 2017/0118456 A1 | 4/2017 | Lee et al. | |
| 2017/0142312 A1 | 5/2017 | Dal Mutto | |
| 2018/0176440 A1 | 6/2018 | Chen et al. | |
| 2018/0262673 A1 | 9/2018 | Urfalioglu | |
| 2019/0026956 A1 | 1/2019 | Gausebeck et al. | |
| 2019/0227174 A1* | 7/2019 | Hitomi | G01S 17/89 |
| 2019/0243376 A1* | 8/2019 | Davis | G06T 7/292 |
| 2020/0084384 A1* | 3/2020 | Wolff | H04N 17/002 |
| 2021/0201070 A1* | 7/2021 | Omari | G01C 21/3635 |

FOREIGN PATENT DOCUMENTS

| | | |
|---|---|---|
| CN | 107894215 A | 4/2018 |
| CN | 109069132 A | 12/2018 |
| CN | 109087325 A | 12/2018 |
| JP | 2017059998 A | 3/2017 |
| KR | 101887945 | 8/2018 |

OTHER PUBLICATIONS

GB Combined Search and Examination Report for corresponding Application No. GB1908935.8, Dec. 2, 2019, 8 pages.

Sansoni et al., "Three-dimensional vision based on a combination of gray-code and phase-shift light projection: analysis and compensation of the systematic errors," Applied Optics, Vo. 38, Issue 31, Nov. 1, 1999, pp. 6565-6573.

Chinese Office Action (w/ English translation) for corresponding Application No. 202080059570, dated Apr. 4, 2024, 12 pages.

* cited by examiner

Algorithm 1 Online algorithm

1: procedure ComputeCandidateTimes($E$)
2:     $T \leftarrow$ sorted times from $E$
3:     $n \leftarrow |E|$
4:     $T_c \leftarrow \varnothing$
5:     $t_{min} \leftarrow$ minimum possible exposure time
6:     $t_{max} \leftarrow$ maximum possible exposure time
7:     for $t_i, t_{i+1}$ in $T$ do
8:         if $i = 0$ and exists enough overexposed pixels in $I(t_0)$ then
9:             Add $k$ times $< t_i$ to $T_c$ with $m$ stops between them (e.g. $m = 1/2, k = 6$)
10:         else if $i = n - 1$ and exists enough underexposed pixels in $I(t_{n-1})$ then
11:             Add $k$ times $> t_i$ to $T_c$ with $m$ stops between them (e.g. $m = 1/2, k = 6$)
12:         else if Exists enough pixels which are underexposed in $t_a$ and overexposed in $t_b$ then
13:             Add $k$ times $\in (t_a, t_b)$ to $T_c$
14:         end if
15:     end for
16:     return $T_c$
17: end procedure
18:
19: procedure ComputeExpectedNum($t, E$)
20:     $n = 0$
21:     for All bad pixels with $\sigma(p) > \sigma_{max}$ do
22:         $n = n + \Pr(\sigma(p) < \sigma_{max} \mid t)$, where Pr is computed based on category of $p$.
23:     end for
24:     return $n$
25: end procedure
26:
27: Let $(t_0, I(t_0))$ be our best guess for initial exposure
28: $E = \{(t_0, I(t_0))\}$
29: while $|E| \leq k$ or $\sum_{t \in E} t < T_{max}$ or some other condition do
30:     $T^* =$ ComputeCandidateTimes($E$)
31:     For each $t_i \in T^*$ compute $n(t_i) =$ ComputeExpectedNum($t_i, T$)
32:     Add $(t_i, I(t_i))$ with largest $n(t_i)$ to $E$ and remove all good pixels from consideration.
33: end while

Fig. 13

METHOD FOR DETERMINING ONE OR MORE GROUPS OF EXPOSURE SETTINGS TO USE IN A 3D IMAGE ACQUISITION PROCESS

CROSS-REFERENCE TO RELATED APPLICATIONS

The present application is a national phase application of PCT International Application No. PCT/EP2020/067244, filed Jun. 19, 2020, which, in turn, is based upon and claims the right of priority to GB Patent Application No. 1908935.8, filed Jun. 21, 2019, the disclosures of both of which are hereby incorporated by reference herein in their entirety for all purposes.

FIELD

Embodiments described herein relate to a method for determining one or more groups of exposure settings to use in a 3D image acquisition process. Embodiments described herein also relate to a system for generating a three-dimensional image of an object.

BACKGROUND

Three-dimensional surface imaging (3D surface imaging) is a fast growing field of technology. The term "3D surface imaging" as used herein can be understood to refer to the process of generating a 3D representation of the surface(s) of an object by capturing spatial information in all three dimensions—in other words, by capturing depth information in addition to the two-dimensional spatial information present in a conventional image or photograph. This 3D representation can be visually displayed as a "3D image" on a screen, for example.

A number of different techniques can be used to obtain the data required to generate a 3D image of an object's surface. These techniques include, but are not limited to, structured light illumination, time of flight imaging, holographic techniques, stereo systems (both active and passive) and laser line triangulation. In each case, the data may be captured in the form of a "point cloud", in which intensity values are recorded for different points in three-dimensional space, with each point in the cloud having its own set of (x, y, z) coordinates and an associated intensity value I.

FIG. 1 shows an example of how the data in the point cloud may be stored in memory. As shown, the data is stored in the form of a two-dimensional point cloud matrix 101 having N rows and M columns. Each element in the matrix comprises a data tuple that includes an $\{x_{ij}\ y_{ij},\ z_{ij}\}$ coordinate for a point in the cloud, where $i=\{1, 2 \ldots N\}$, $j=\{1, 2, \ldots M\}$ and N and M are integer values. The data tuple also includes an intensity value $I_{ij}$ for that point. The intensity values and their respective spatial coordinates together define the geometry of the external surfaces of the object under consideration. The points can be rendered in three dimensions so as to provide a 3D representation of the object.

In some cases, the point cloud data may be computed from one or more two-dimensional images of the object as acquired using a 2D sensor array. In such cases, the elements in the point cloud matrix may be mapped to pixel elements in the sensor array. For example, for a given matrix element, the i and j indices may indicate the position of the respective pixel element in the sensor array. The $\{x_{ij}\ y_{ij},\ z_{ij}\}$ coordinates may then define the position in space of a point as seen in that pixel in one or more of the two-dimensional images.

As with all forms of imaging, the signal-to-noise ratio (SNR) in the final 3D image will be determined in part by the dynamic range of the sensor used to capture the image data. If the signal strength received from different points on the object is likely to vary considerably—because the object's surface contains a number of very bright and very dark regions, for example—then a balance must be struck between (i) maximizing the illumination intensity and/or sensor exposure time so as to ensure sufficient light is received from the darker regions of the object, and (ii) minimizing the illumination intensity and/or sensor exposure time to avoid saturating the sensor with signal from the brighter regions of the object. In order to address this problem, one proposed solution is to apply the concept of High Dynamic Range (HDR) Imaging to 3D imaging. High Dynamic Range Imaging (HDR) is an established technique for increasing dynamic range in light levels seen in digital images. The technique comprises capturing several images of the same scene with different exposure times, and post-processing the data from the images to produce a single HDR image of the scene. The images captured at longer exposure times permit capture of detail in darker areas of the scene, which cannot be discerned in images captured at shorter exposure times due to insufficient signal reaching the camera. The images captured at shorter exposure times meanwhile permit capture of detail in brighter areas of the scene, which cannot be discerned in the images captured at longer exposure times due to camera saturation. By post-processing these images using a suitable HDR algorithm, it is possible to obtain a single, high definition image in which the elements of detail are visible across both light and dark regions of the image.

The principles of HDR imaging are, broadly speaking, applicable to 3D imaging in the same way as conventional 2D imaging. FIG. 2 shows, schematically, an example of how this might be implemented. In a similar fashion to 2D HDR imaging, multiple image data sets can be captured with different exposure settings, but in this case, the image data sets comprise 3D image data, rather than 2D image data, i.e. the image data sets specify the three-dimensional positions of points in the scene being looked at. Each image data set can be stored in the form of a respective point cloud matrix 201a, 201b, 201c. The point cloud matrices can then be merged into a single point cloud matrix 203 from which the 3D HDR image can be rendered. 3D HDR imaging does, however, pose additional challenges compared to 2D HDR imaging. One problem is that, in contrast to 2D imaging, an additional step of computation is required in order to obtain the three-dimensional coordinates of each point; the effect of any shortfall in SNR in the acquired image data may be compounded by this additional computation, significantly influencing the accuracy with which the 3D coordinates of each point in the output image are calculated. It is also difficult to identify appropriate exposure settings for capturing each set of image data to be used in generating the final 3D image.

It follows that there is a need to provide improved techniques for generating 3D HDR images.

SUMMARY

According to a first aspect of the present invention, there is provided a method for determining one or more groups of exposure settings to use in a 3D image acquisition process carried out with an imaging system, the imaging system comprising an image sensor and the 3D image acquisition process comprising capturing one or more sets of image data on the image sensor using the respective groups of exposure settings, wherein the one or more sets of image data are such as to allow the generation of one or more 3D point clouds defining the three-dimensional coordinates of points on the surface(s) of one or more objects being imaged, each group of exposure settings specifying a value for one or more parameters of the imaging system that will affect the amount of signal reaching the image sensor, the method comprising:

(i) identifying, using image data captured on the image sensor, one or more candidate groups of exposure settings;

(ii) for each candidate group of exposure settings:

determining an amount of signal likely to be received in different pixels of the image sensor in the event that the candidate group of exposure settings is used to capture a set of image data for use in the 3D image acquisition process, determining, based on the amount of signal likely to be received in the different pixels, whether or not the respective pixels would be well-exposed pixels if using the candidate group of exposure settings, wherein a well-exposed pixel is one for which the value of a quality parameter associated with that pixel is above a threshold, wherein the value of the quality parameter for a pixel reflects a degree of uncertainty that would be present in the three dimensional coordinates of a point in a point cloud associated with that pixel, in the event that the point cloud were to be generated using the set of image data captured with the candidate group of exposure settings;

determining an exposure cost, wherein the exposure cost is derived from the values of the one or more parameters in the candidate group of exposure settings; and (iii) selecting, from the one or more candidate groups of exposure settings, one or more groups of exposure settings to be used for the 3D image acquisition process, the selection being such as to satisfy one or more optimization criteria, wherein the one or more optimization criteria are defined in terms of:

(a) the number of pixels in the set N, wherein a pixel will belong to the set N if there is at least one selected group of exposure settings for which the pixel is determined as being a well-exposed pixel; and (b) the exposure cost(s) for the one or more selected groups of exposure settings.

In some embodiments, each of the one or more sets of image data is such as to allow the generation of a respective 3D point cloud. In such embodiments, a respective set of image data may comprise image data that is captured with a respective group of exposure settings and then combined with previously captured image data so as to form a new set of image data from which it is possible to generate a 3D point cloud.

In some embodiments, the different pixels comprise a subset of all the pixels on the image sensor. In some embodiments, the different pixels all belong to a predefined region of the image sensor. In some embodiments, the different pixels comprise the entirety of the pixels in the image sensor.

In some embodiments, for each candidate group of exposure settings, the method comprises:

identifying one or more alternative candidate groups of exposure settings for which the one or more parameters of the imaging system have different values, but for which the amount of signal expected to be received at the image sensor is the same; and for each alternative candidate group of exposure settings, determining an exposure cost, wherein the exposure cost is derived from the values of the one or more parameters in the alternative candidate group of exposure settings;

wherein the one or more alternative candidate groups of exposure settings are available to be selected for use in the 3D image acquisition process.

The selection of the one or more candidate groups of exposure settings may be such as to ensure that a ratio of the number of pixels in the set N and the exposure cost(s) for the one or more selected groups of exposure settings meet a criterion.

The selection of the one or more candidate groups of exposure settings may be such as to ensure that:

(a) the number of pixels in the set N meets a first criterion; and (b) the exposure cost(s) for the one or more selected groups of exposure settings meet a second criterion.

The first criterion may be to maximise the number of pixels that belong to the set N. The first criterion may be to ensure that the number of pixels that belong to the set N is above a threshold.

The second criterion may be to minimise the sum of the exposure costs. The second criterion may be to ensure that the sum of the exposure costs for each of the selected groups of exposure settings is beneath a threshold.

In some embodiments, for one or more of the candidate groups of exposure settings, the step of determining an amount of signal likely to be received in different pixels of the image sensor in the event that the candidate group of exposure settings is used to capture a set of image data comprises capturing a set of image data with the candidate group of exposure settings.

The set(s) of image data captured when using the one or more candidate groups of exposure settings may be used to identify one or more other candidate groups of exposure settings.

In some embodiments, steps (i) to (iii) are repeated through one or more iterations, wherein for each iteration:

a single one of the candidate group of exposure settings identified in that iteration is selected; and the optimization criteria include a first criterion that is to maximise the number of pixels in the set N and a second criterion that is to ensure that the sum of the exposure cost for the group of exposure settings selected in the present iteration and the respective exposure costs for the groups of exposure settings selected in all previous iterations is below a threshold.

For each iteration, the selected group of exposure settings may be used to capture a set of imaging data with the imaging system;

wherein for each iteration from the second iteration onwards, the set of image data captured in the previous iteration is used in determining the candidate groups of exposure settings for the present iteration.

The step of determining whether or not respective pixels would be well-exposed pixels if using a candidate group of exposure settings may comprise determining a probability that the respective pixels will be well exposed, the probability being determined based on the amount of signal received in those pixels in previous iterations of the method.

The exposure cost for each group of exposure settings may be a function of the exposure time used in that group of settings.

The step of identifying one or more candidate groups of exposure settings may comprise determining, for one or more pixels of the image sensor, a range of exposure times for which the pixel is likely to be a well exposed pixel.

The value of the quality parameter associated with a pixel may be determined based on the amount of ambient light in the scene being imaged.

In some embodiments, each group of exposure settings comprises one or more of:
 the exposure time of the image sensor;
 the size of an aperture stop in the path between the object and the sensor;
 an intensity of light used to illuminate the object; and
 the strength of an ND filter placed in the light path between the object and the sensor.

The imaging system may be an optical imaging system comprising one or more light sensors. The imaging system may include one or more light sources that are used to illuminate the object(s) being imaged.

The image data in each set of image data may comprises one or more 2D images of the object as captured on the sensor.

The imaging system may be one that uses structured illumination to obtain each set of image data.

Each set of image data may comprise a sequence of 2D images of the object as captured on the light sensor, each 2D image in the sequence being captured using a different illumination pattern.

Each set of image data may comprise a sequence of Gray-coded images and a sequence of phase shifted images.

Each set of image data may comprises colour information.

According to a second aspect of the present invention, there is provided a method for generating a 3D image of one or more objects using an imaging system comprising an image sensor, the method comprising:
 capturing, on the image sensor, one or more sets of image data using respective groups of exposure settings, the sets of image data being such as to allow the generation of one or more 3D point clouds defining the three-dimensional coordinates of points on the surface(s) of the one or more objects, each group of exposure settings specifying a value for one or more parameters of the imaging system that will affect the amount of signal reaching the image sensor; and
 constructing a 3D point cloud using the data from one or more of the captured sets of image data;
 wherein the exposure settings used for capturing each set of image data are determined using a method according to the first aspect of the present invention.

According to a fourth aspect of the present invention, there is provided a computer readable storage medium comprising computer executable code that when executed by a computer will cause the computer to carry out a method according to the first aspect of the present invention.

According to a fifth aspect of the present invention, there is provided an imaging system for performing a 3D image acquisition process by capturing one or more sets of image data with one or more groups of exposure settings, the one or more sets of image data being such as to allow the generation of one or more 3D point clouds defining the three-dimensional coordinates of points on the surface of one or more objects being imaged, the imaging system comprising an image sensor for capturing the one or more sets of image data, the imaging system being configured to determine the one or more groups of exposure settings to use for the 3D image acquisition process by carrying out a method in accordance with the first aspect of the present invention.

Embodiments described herein provide a means for obtaining 3D HDR images of an object. A 3D HDR image is obtained by capturing multiple sets of image data. The image data may be obtained using one of several techniques known in the art; these techniques may include, for example, structured light illumination, time of flight imaging and holographic techniques, as well as stereo imaging (both active and passive) and laser line triangulation. Each set of image data can be used to compute a respective input point cloud that specifies the three-dimensional coordinates of points on the object surface and their intensities. The information in each set of image data can be combined or merged in such a way as to provide a single output point cloud, from which a 3D image of the object can be rendered.

The sets of image data may be acquired with different groups of exposure settings, such that the exposure of the imaging system differs for each set of image data. Here, an "exposure setting" refers to a physical parameter of the imaging system that can be adjusted in order to vary the exposure of the system. In the case where an optical imaging system is being used, a group of exposure settings may include parameters that directly affect the amount of light incident on the image sensor; examples of such parameters include one or more of the integration time of the camera/light sensor, the size of the camera/light sensor aperture and the intensity of light used to illuminate the scene or object. The group of exposure settings may also include the strength of a neutral density filter placed in the light path between the object and the camera/light sensor. The strength of the neutral density filter may be altered each time a new set of image data is acquired, so as to vary the amount of light reaching the camera or light sensor.

It will be appreciated that in addition to parameters that affect the amount of light incident on the sensor, other parameters of the system may also be varied between exposures; these parameters may include the sensitivity of the camera or light sensor, for example, which can be varied by adjusting the gain applied to the device.

In some embodiments, only one of the exposure settings may be varied for each exposure, with the other exposure settings remaining constant each time a new set of image data is acquired. In other embodiments, two or more of the settings may be varied in-between capturing each new set of image data.

Where the image data is acquired with a greater exposure, this will maximize the signal that is detected from darker regions of the object or scene. The SNR for points in the darker regions can thereby be increased, allowing the spatial coordinates of those points to be computed with greater accuracy if compiling a point cloud from that set of image data. Conversely, adjusting the exposure settings in such a way as to reduce the exposure makes it possible to maximize the signal that is captured from brighter regions of the object or scene without the camera or light sensor becoming saturated; thus, by reducing the exposure, it is possible to obtain a second set of image data in which the SNR for points in the brighter regions can be increased. In turn, it becomes possible to generate a second point cloud in which the spatial coordinates of points in those brighter regions can be computed with greater accuracy. The image data from these different exposures can then be combined in such a way as to ensure that the SNR in the output 3D image is enhanced for both the brighter and darker regions of the object.

In order to determine how best to combine the data from the respective exposures, in embodiments described herein, an additional "quality parameter" is evaluated for each point in each set of image data. FIG. 3 shows an example of a point cloud matrix 301 as used in an embodiment. In contrast to the conventional point cloud matrix of FIG. 1, each element of the point cloud matrix in FIG. 3 includes an additional value $q_{ij}$. The value of the quality parameter $q_{ij}$ reflects the degree of uncertainty in the $\{x_{ij}, y_{ij}, z_{ij}\}$ coordinates of that respective point in the matrix. In some embodiments, the value of the quality parameter provides a best estimate of the expected error in the $\{x_{ij}, y_{ij}, z_{ij}\}$ values at that point.

The quality parameter may be defined in one of a number of different ways, depending on the particular technique used to capture the image data. In one example discussed in more detail below, a structured illumination approach is employed to acquire the image data from which an output point cloud is computed; in this case, the value of the quality parameter for a given point may, for example, be derived from a degree of contrast seen at that point on the object's surface as the light and dark fringes in the structured illumination pattern are projected on it. In other words, the quality parameter may be related to or derived from the difference in the amount of light detected from that point when illuminated by a light fringe in the illumination pattern and the amount of light detected from that point when illuminated by a dark fringe. In some embodiments, a series of sinusoidally modulated intensity patterns may be projected on to the object, with the intensity patterns in the successive images being phase shifted with respect to one another; here, the quality parameter may be related to or derived from the intensity measured at each point, as each one of the intensity patterns is projected onto the object.

In another example, if using a time-of-flight system for 3D imaging, the amplitude of the recovered signal at a given point may be compared with a measure of the ambient light in the system in order to derive a value of the quality parameter at that point. In a further example, if using a stereo-imaging system, the quality parameter may be obtained by comparing and matching features identified in an image captured on a first camera with features identified in an image captured on a second camera, and determining a score for the quality of the match. The score might be computed, for example, as a sum of absolute differences (SAD):

$$SAD(r, c, x, y) = \sum_{(a,b)}^{(A,B)} |I_1(r+a, c+b) - I_2(r+a+x, c+b+y)|$$

where (r, c) are the image pixel coordinates, $I_1$, $I_2$ is the stereo image pair, (x, y) is the disparity that SAD is evaluated for, and (A, B) are the dimensions (in number of pixels) of the array over which the matching is carried out. The disparity estimate (x', y') is found for pixel (r, c) using (x', y')=argmin$_{x,y}$ SAD (r, c, x, y). Depending on the estimated SAD value, this can be then further interpreted as a measure of the uncertainty in the 3D coordinates at each point in a reconstructed point cloud based on the stereo images. If desirable, the SAD could be normalized towards e.g. regional image intensity to improve performance.

Regardless of which particular imaging method is used to acquire the image data, the quality parameter can be used to determine the extent to which the data from each exposure is taken into consideration when deriving the coordinate values of points in the final 3D image. In some embodiments, each set of image data may be used to construct a respective input point cloud matrix. Then, for a given element $\{i, j\}$ in the point cloud matrix used to construct the final 3D image, the set of coordinate values $\{x_{ij}, y_{ij}, z_{ij}\}$ for that point may be derived by applying a respective weighting to each set of coordinate values $\{x_{ij}, y_{ij}, z_{ij}\}$ at the same position $\{i, j\}$ in the input point cloud matrices. The weighting applied in each matrix may be dependent on the value of the quality parameter $q_{ij}$ at that position in the respective matrix. In this way, the values $\{x_{ij}, y_{ij}, z_{ij}\}$ in the output point cloud matrix can be biased towards values obtained from the image data set(s) having a higher SNR at the point in question.

In another example, the set of coordinate values $\{x_{ij}, y_{ij}, z_{ij}\}$ for the element $\{i, j\}$ in the output point cloud matrix may be chosen by selecting the $\{x_{ij}, y_{ij}, z_{ij}\}$ values from a single one of the input cloud matrices. The input point cloud matrix from which the values are selected may be the one having the highest value of q at that point, compared with the other input matrices.

In another example, for a given element $\{i, j\}$ in the output point cloud matrix, the set of coordinate values $\{x_{ij}, y_{ij}, z_{ij}\}$ for that point may be derived by averaging the respective sets of coordinate values $\{x_{ij}, y_{ij}, z_{ij}\}$ that lie at the position $\{i, j\}$ in the input point cloud matrices. That is, the value $x_{ij}$ in the output point cloud matrix may comprise an average of each one of the values $x_{ij}$ at the point $\{i, j\}$ in the respective input point cloud matrices, the value $y_{ij}$ in the output point cloud matrix may comprise an average of each one of the values $y_{ij}$ at the point $\{i, j\}$ in the respective input point cloud matrices and the value $z_{ij}$ in the output point cloud matrix may comprise an average of each one of the values $z_{ij}$ at the point $\{i, j\}$ in the respective input point cloud matrices. The averaging may be subject to a threshold criterion, whereby only those values for which the associated q value is above a threshold are used in calculating the average value. So, for example, if the values $\{x_{ij}, y_{ij}, z_{ij}\}$ in an element of one of the input point cloud matrices are accompanied by a q value that is below the threshold, the values $\{x_{ij}, y_{ij}, z_{ij}\}$ in that element may be disregarded for the purpose of calculating the values $\{x_{ij}, y_{ij}, z_{ij}\}$ to be used in the output point cloud matrix.

It will be understood that the thresholding criterion may also be applied in the other scenarios described above; for example, if computing the values $\{x_{ij}, y_{ij}, z_{ij}\}$ for an element $\{i, j\}$ in the output point cloud matrix by applying a respective weighting to the sets of coordinate values $\{x_{ij}, y_{ij}, z_{ij}\}$ at the same position $\{i, j\}$ in the point cloud matrices of the input matrices, a zero weighting may be applied to those sets of coordinate values $\{x_{ij}, y_{ij}, z_{ij}\}$ that are accompanied by a q value that is below the threshold.

It will be appreciated that in order to construct the point cloud for the final 3D image, it will not always be necessary to construct a respective point cloud for each set of acquired image data; rather, in some embodiments it may be possible, through use of a suitable algorithm, to deduce the value of the quality parameter for a given pixel by considering the actual amount of signal received in that pixel during the course of an exposure, without the need to actually construct a point cloud from that data. In order to generate the point cloud for the final 3D image, the sets of image data obtained from each exposure may be merged to generate a single merged set of image data. The values for each pixel in the merged set of data may then be based on the values for that pixel in one or more of the acquired sets of image data, with a bias towards those sets of image data for which the pixel in question is associated with a higher value of the quality parameter.

BRIEF DESCRIPTION OF DRAWINGS

Embodiments of the invention will now be described by way of example with reference to the accompanying drawings in which:

FIG. 13 shows pseudocode for implementing an algorithm according to an embodiment.

DETAILED DESCRIPTION

Figure 4:
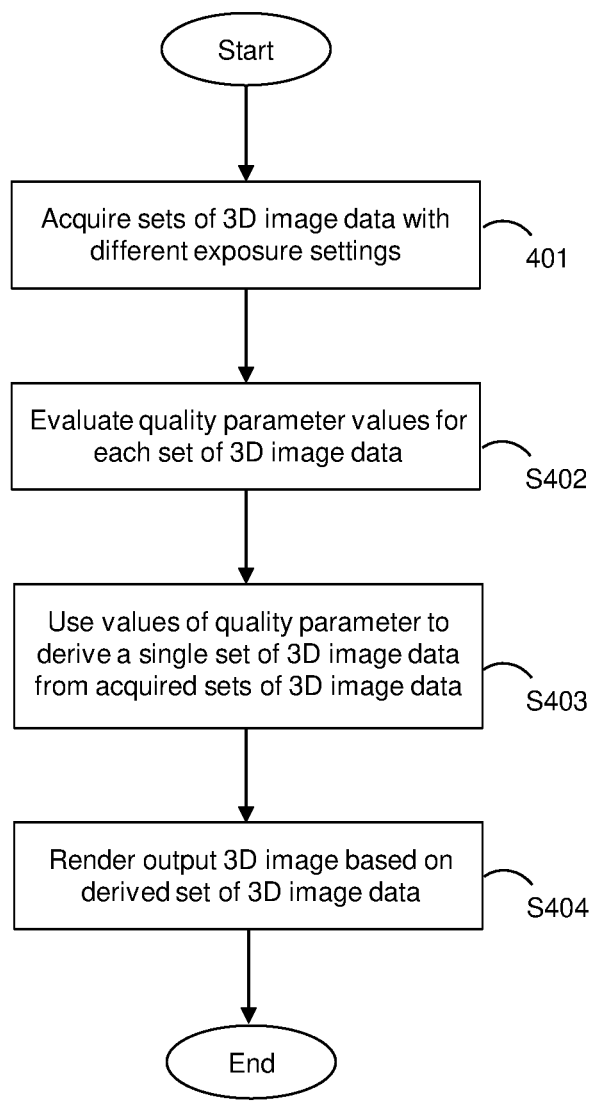
FIG. 4 shows a flow-chart of steps in an embodiment described herein.

FIG. 4 shows a flow-chart of steps carried out in embodiments described herein. In a first step S401, a plurality of sets of 3D image data are acquired by an imaging system. Each set of 3D image data can be used to compute a respective input point cloud that defines the 3D coordinates of different points on the surface of an object being imaged, together with a value for the intensity or brightness level of the surface at each point.

In step S402, the value of a quality parameter is evaluated for the data associated with each point in each one of the respective input point clouds. As discussed above, the value of the quality parameter comprises a measure of the uncertainty in the three-dimensional co-ordinates at each point. The quality parameter may be computed as a function of the acquired intensity values that are used to calculate the spatial coordinates at each point in the respective input point clouds.

In step S403, a single output set of 3D image data is computed based on the image data contained in each one of the acquired sets of image data. In common with the acquired image data sets, the output set of image data defines values for the 3D coordinates of different points on the surface of the object being imaged, together with the intensity or brightness level of the surface at each point. Here, the values for the 3D coordinates are computed by weighting the values for the 3D coordinates specified in the respective input point clouds, in accordance with their respective quality parameter values. The output image data set can then be used to render a 3D image of the object (step S404).

An example embodiment using a structured light illumination method to acquire 3D image data will now be described with reference to FIGS. 5 to 7.

Figure 5A:
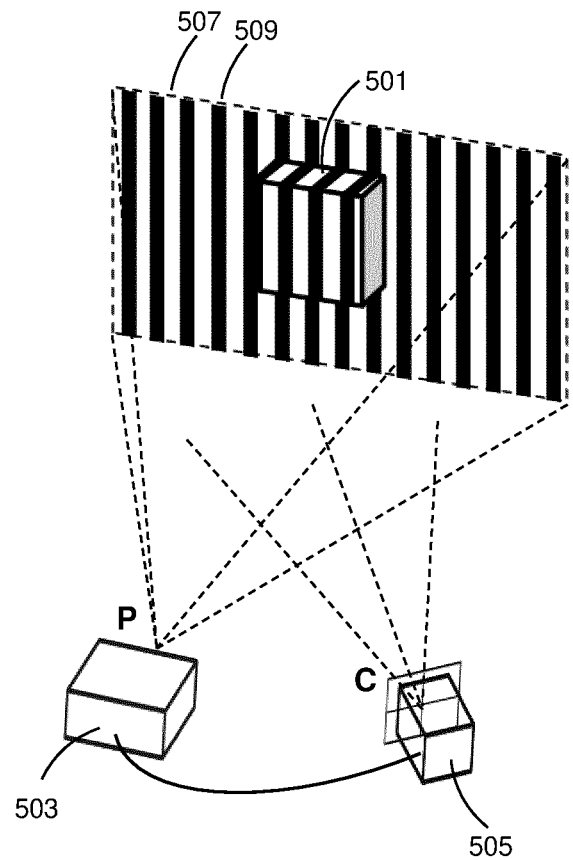
FIG. 5A shows a schematic of a structured illumination imaging system in an embodiment.
Figure 6:
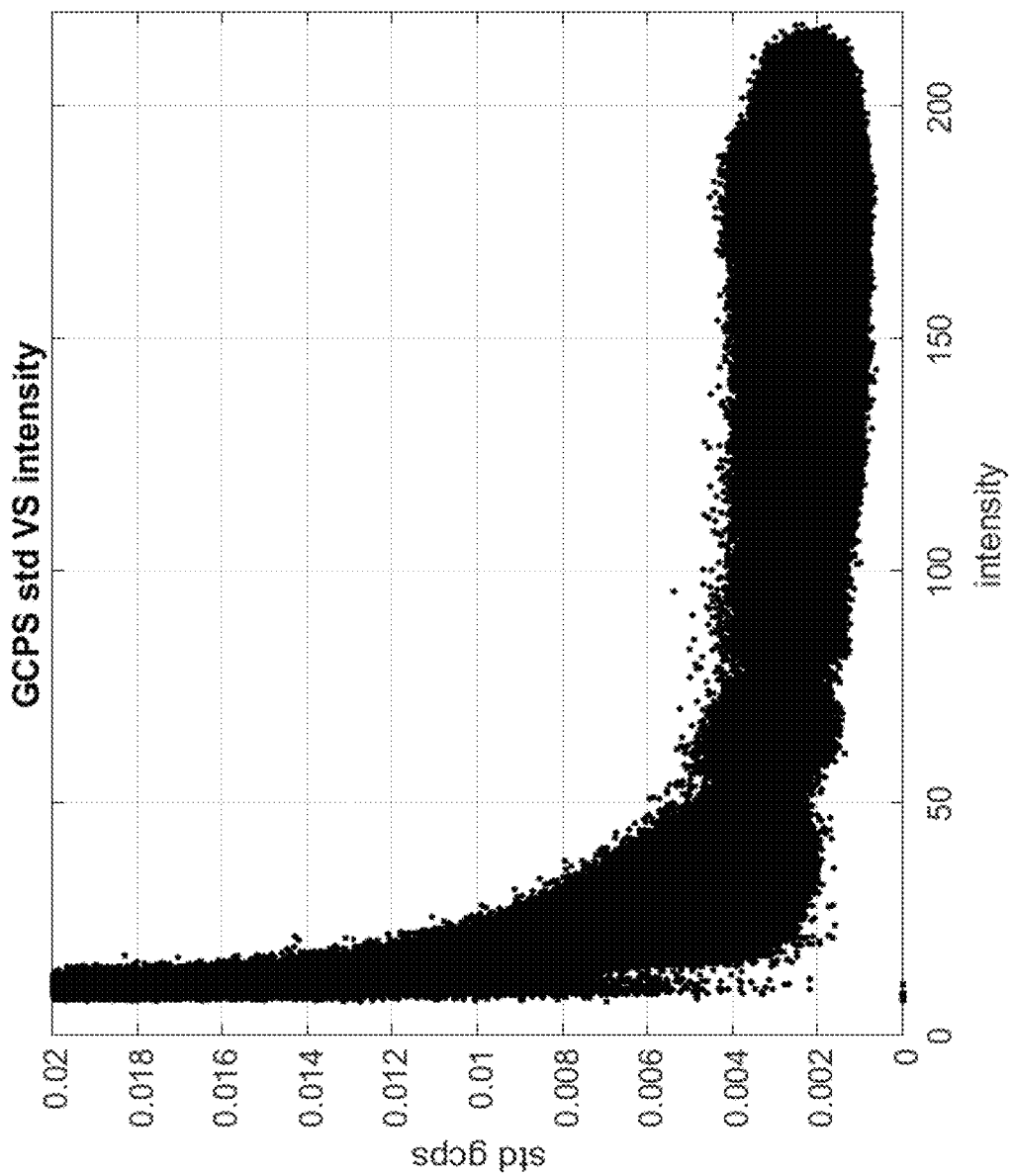
FIG. 6 shows an example of how the standard deviation in a GCPS value may vary as a function of signal amplitude, in an embodiment in which a combination of Gray-coding and phase shifting is used to recover 3D spatial information from an object.

Referring to FIG. 5A, there is shown a schematic of a system suitable for capturing 3D images of an object 501 using structured light illumination. The system comprises a projector 503 and a camera 505. The projector is used to project a spatially varied 2D illumination pattern onto the object 40. The pattern itself comprises a series of light and dark fringes 507, 509. The pattern may be generated using a spatial light modulator, for example. The camera 505 is used to acquire a 2D image of the object as illuminated by the projector.

Figure 5B:
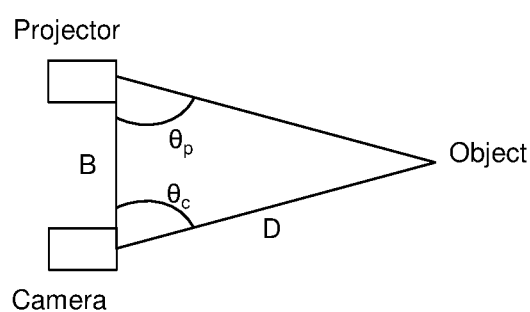
FIG. 5B shows a schematic of the geometry of the structured illumination imaging system of FIG. 5A.

FIG. 5B shows a simplified diagram of the system geometry. The camera and projector are located a distance B apart. A point on the object that lies a distance D away from the camera and projector is located at an angle $\theta_c$ from the camera and $\theta_p$ from the projector. Owing to the angle between the camera and the projector, any variations in the surface topology of the object will cause the pattern of light and dark fringes, as detected by the camera, to become distorted. By corollary, the distortion in the pattern will encode information about the 3D surface of the object, and can be used to deduce its surface topology. The 3D information can be recovered by capturing sequential images in which the object is illuminated with different patterns of light, and comparing the measured intensity for each pixel across the sequence of images.

In the present embodiment, a phase shifting technique is used to obtain the 3D information. Phase shifting is a well-known technique in which a sequence of sinusoidally modulated intensity patterns is projected onto the object, with each pattern being phase shifted with respect to the previous one. A 2D image of the illuminated object is captured each time the intensity pattern is changed. Variations in the surface topology of the object will give rise to a change in the phase of the intensity pattern as seen by the camera at different points across the surface. By comparing the intensities of light in the same pixel across the sequence of 2D images, it is possible to compute the phase at each point, and in turn use this to obtain depth information about the object. The data is output as a 2D array, in which each element maps to a respective one of the pixels of the camera, and defines the 3D spatial coordinates of a point as seen in that pixel.

It will be appreciated that other techniques, besides phase shifting, may also be used to recover the 3D spatial information; for example, in some embodiments, a Gray-coding technique may be used, or a combination of Gray-coding and phase shifting. The precise algorithms used to decode the 3D spatial information from the sequence of 2D images will vary depending on the specific illumination patterns and the way in which those patterns are varied across the sequence of images; further information on algorithms for recovering the depth information using these and other techniques is available in the publication "Structured light projection for accurate 3D shape determination" (O. Skotheim and F. Couweleers, ICEM12-12$^{th}$ International Conference on Experimental Mechanics 29 August-2 September, 2004, Politecnico di Bari, Italy). In each case, the 3D spatial information in the object is computed by considering the variation in intensities at each point on the object as the illumination pattern changes and the points are exposed to light and dark regions of the pattern.

In one example, in which a combination of Gray-coding and phase shifting is used to recover the 3D spatial information, the projector is used to project a series of both Gray-code and phase-shifted patterns onto the object. (Further details of such a method can be found, for example, in an article by Giovanna Sansoni, Matteo Carocci and Roberto Rodella, entitled "Three-dimensional vision based on a combination of Gray-code and phase-shift light protection: analysis and compensation of the systematic errors"—Applied Optics, 38, 6565-6573, 1999). Here, for each point on the object, two corresponding pixel positions can be defined: (i) the projector pixel coordinate i.e. a pixel position in the projector from which the light that is incident on that point on the object is emanating, and (ii) the camera pixel coordinate i.e. the pixel position in the camera at which the light reflected by that point on the object is captured. Using a suitable algorithm, and taking into account the relative positions of the camera and projector (these relative positions being determined straightforwardly using a standard calibration measurement), the images captured at the camera can be processed in order to determine, for each camera pixel, the corresponding projector pixel coordinate. In effect, a determination can be made as to which projector pixel a particular camera pixel is "looking at". Moreover, by combining the image data received from the Gray-code patterns and phase shifted patterns, the projector pixel coordinate can be determined with higher resolution than the projector pixels themselves.

The above methodology can be understood as follows. First, by choosing a number of N Gray code patterns, and setting the number of sinusoidal fringes in the phase shifting patterns to $2^N$, the fringes can be aligned with the binary transitions in the sequence of N Gray code patterns. The resulting Gray code words, GC(i, j) and the values obtained for the phase, $\phi$(i,j), can be combined to form a set of "GCPS" values that describe the absolute fringe position in each position in the field of view. The GCPS values can in turn be used to determine the projector pixel coordinates by performing a scaling of the values from a minimum/maximum of the code to the width ($w_p$) and height ($h_p$) of the projector image; in effect, one is able to measure the "fringe displacement" by estimating the phase of the sine patterns in every pixel in the camera.

Next, it is possible to define:

$$\alpha(i, j) = GCPS_v(i, j) = GC_v(i, j) + \frac{1}{2\pi}\phi_v(i, j)$$

where, $GC_v$(i, j) is the result of the Gray code measurements and $\phi_v$(i,j) is a result of the phase stepping measurements, both performed with vertical fringes. (As before, the indices i,j refer to the pixel elements of the image sensor). From the equation above, it is then possible to calculate the originating subpixel projector column for each pixel in the camera image:

$$P_c(i, j) = 0.5 + (w_p - 1)\frac{\alpha(i, j) - \alpha_{min}}{\alpha_{max} - \alpha_{min}}$$

where $\alpha_{min}$ and $\alpha_{min}$ are the maximum and minimum values for the GCPS code for vertical fringes. Similarly, when obtaining GCPS values using horizontal fringes, it is possible to define:

$$\beta(i, j) = GCPS_h(i, j) = GC_h(i, j) + \frac{1}{2\pi}\phi_h(i, j)$$

Then, using the equation for $\beta$(1, j), it is possible to calculate the originating subpixel projector row for each pixel in the camera image by:

$$P_r(i, j) = 0.5 + (h_p - 1)\frac{\beta(i, j) - \beta_{min}}{\beta_{max} - \beta_{min}}$$

where $\beta_{min}$ and $\beta_{min}$ are the maximum and minimum values for the GCPS code for horizontal fringes.

Having obtained the subpixel projector column and row coordinates $P_c$(i, j), $P_r$(i, j), those values can be used to obtain the {x,y,z} coordinates of points on the object being imaged; specifically, for a given camera pixel p, which is established to be receiving light from a point on the projector g, a position estimate E of a point on the object having coordinates {$x_{ij}$, $y_{ij}$, $z_{ij}$} can be derived by using known triangulation methods, akin to those used for stereo vision, taking into consideration the lens parameters, distance between the camera and projector etc.

The uncertainty in each GCPS value will be largely influenced by the amplitude of the recovered signal and to a lesser degree the presence of ambient light. Experiments carried out by the inventors have shown that the uncertainty in the GCPS value is typically fairly constant until the amplitude of the received signal drops beneath a certain level, after which the uncertainty increases nearly exponentially; this means that the measured amplitude and ambient light can be translated through a pre-established model into an expected measurement uncertainty of the GCPS value—an example is provided in FIG. 6, which shows the standard deviation (std) in the GCPS value as a function of intensity. By using the same calculation as used to obtain the position estimate E above, but now taking the projector pixel position to be g+$\Delta$g, where $\Delta$g is derived from the standard deviation in the GCPS value at the detected signal amplitude, it is possible to obtain a new position estimate E'. An estimated standard deviation $\Delta$E in the position measurement E can then be derived by assuming that $\Delta E=|(|E-E'|)|$. The estimate $\Delta$E can then be used to define the quality parameter.

It will be clear that regardless of precisely which algorithm is used for the structured illumination, in order to compute the 3D spatial information with high accuracy, it will be desirable to measure the variation in intensity at each point on the object with maximal signal to noise; this in turn requires that the contrast in intensity that is seen as a particular point is alternatively exposed to light and dark regions of the illumination pattern should be as high as possible. In line with the earlier discussion, the extent of contrast at a particular point may be limited by the need to accommodate a large range of intensities across the surface of the object; if the surface of the object itself comprises a number of bright and dark regions, then given the finite dynamic range of the camera, it may not be possible to maximize the signal recovered from dark regions of the object's surface without also incurring saturation effects where brighter regions of the object are exposed to the brighter fringes in the illumination pattern. It follows that it may not be possible to optimize the contrast in the intensities seen at every point on the surface in a single exposure (in this context, an "exposure" will be understood to refer to the capture of a sequence of 2D images from which a respective point cloud can be computed).

In order to address the above problem, in embodiments described herein, a number of exposures are taken using different settings. An example of this is shown pictorially in FIG. 7. To begin with, a first sequence of 2D images is captured using a first set of exposure settings. In the present example, the exposure settings are varied by altering the relative size of the camera aperture, although it will be appreciated that the exposure settings may also be varied by adjusting one or more other parameters of the imaging system. The circle 701 shows the relative size of the camera aperture as used to capture the first sequence of images, and the patterns 703*a*, 703*b*, 703*c* show the illumination patterns that are projected onto the object when capturing the respective images in the first sequence of images. As can be seen, each illumination pattern 703*a*, 703*b*, 703*c* comprises a sinusoidally modulated intensity pattern in which a series of alternatively light and dark fringes are projected on to the object. The phase of the pattern across the field of view is illustrated schematically by the wave immediately beneath each pattern, with the dark fringes in the pattern corresponding to the troughs in the wave, and the bright fringes corresponding to the peaks in the wave. As can be seen, the illumination patterns in the successive images are phase shifted with respect to one another, with the positions of the bright and dark fringes in each pattern being translated with respect to one another. A suitable algorithm is used to compare the intensities of light in the same pixel across the sequence of 2D images, in order to compute the depth information at that point. The three-dimensional spatial information is then stored, together with the intensity value for each point, in a first point cloud matrix 705.

Figure 1:
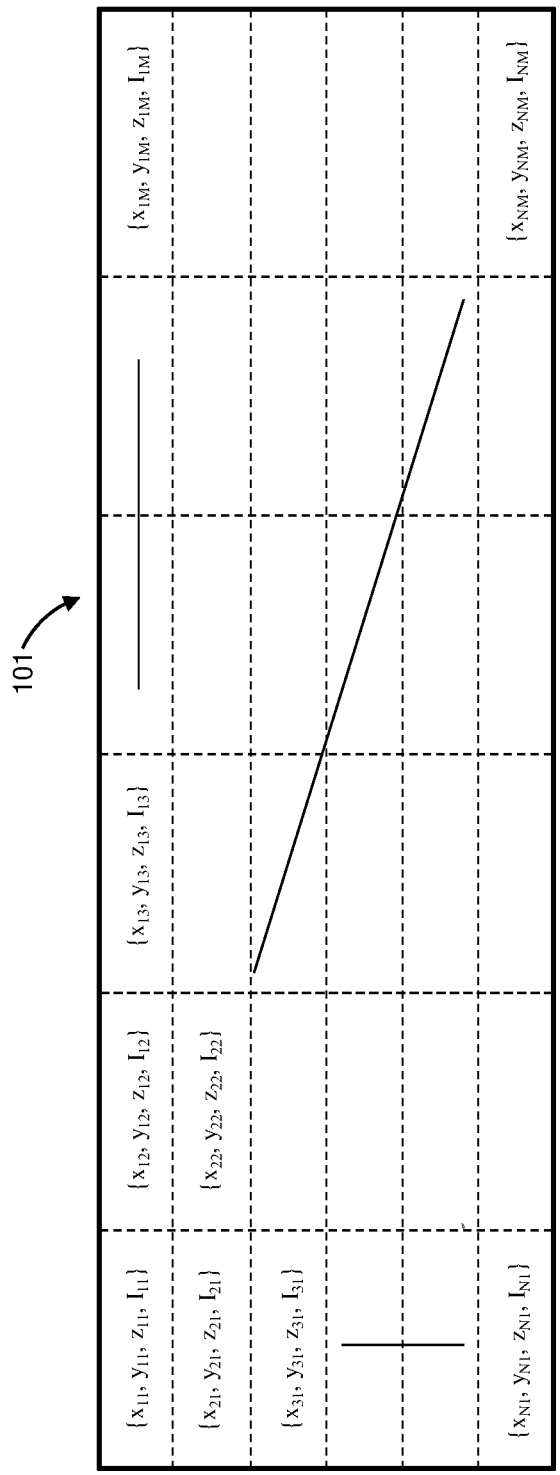
FIG. 1 shows an example of a conventional point cloud matrix.
Figure 2:
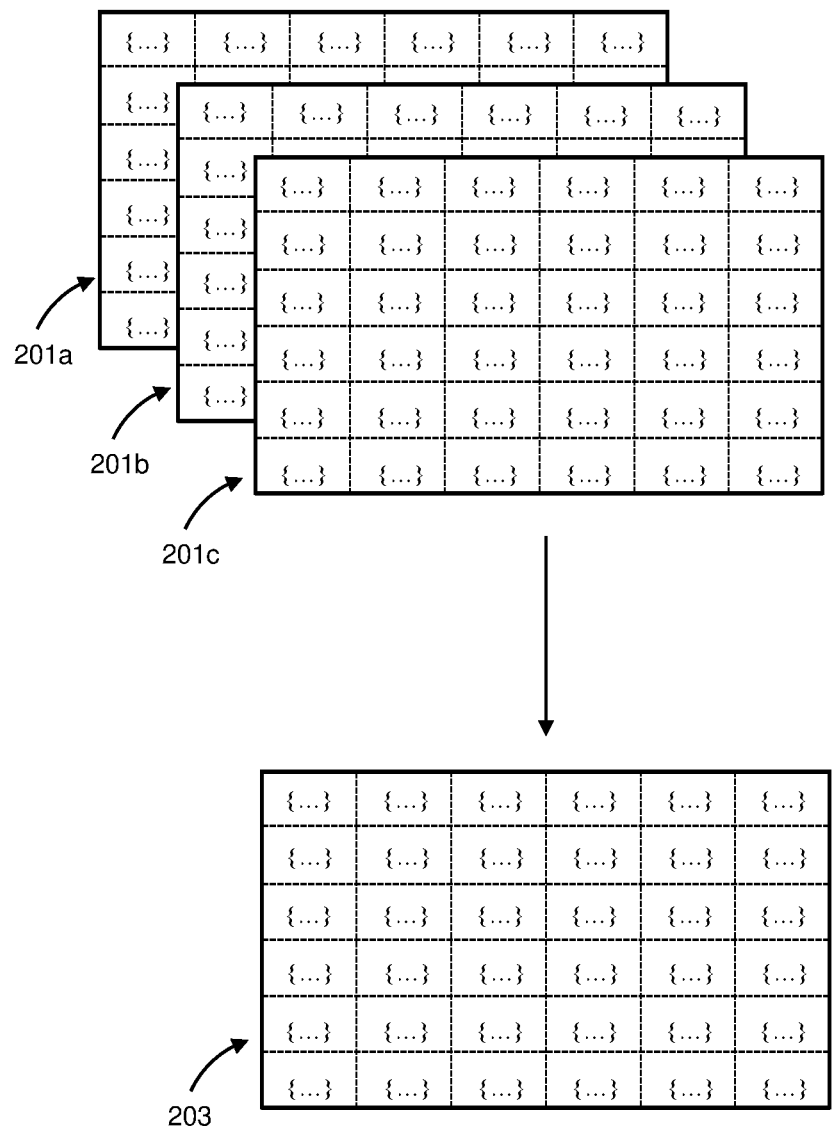
FIG. 2 shows an illustration of how multiple point cloud matrices may be merged or combined to form a single point cloud matrix.
Figure 3:
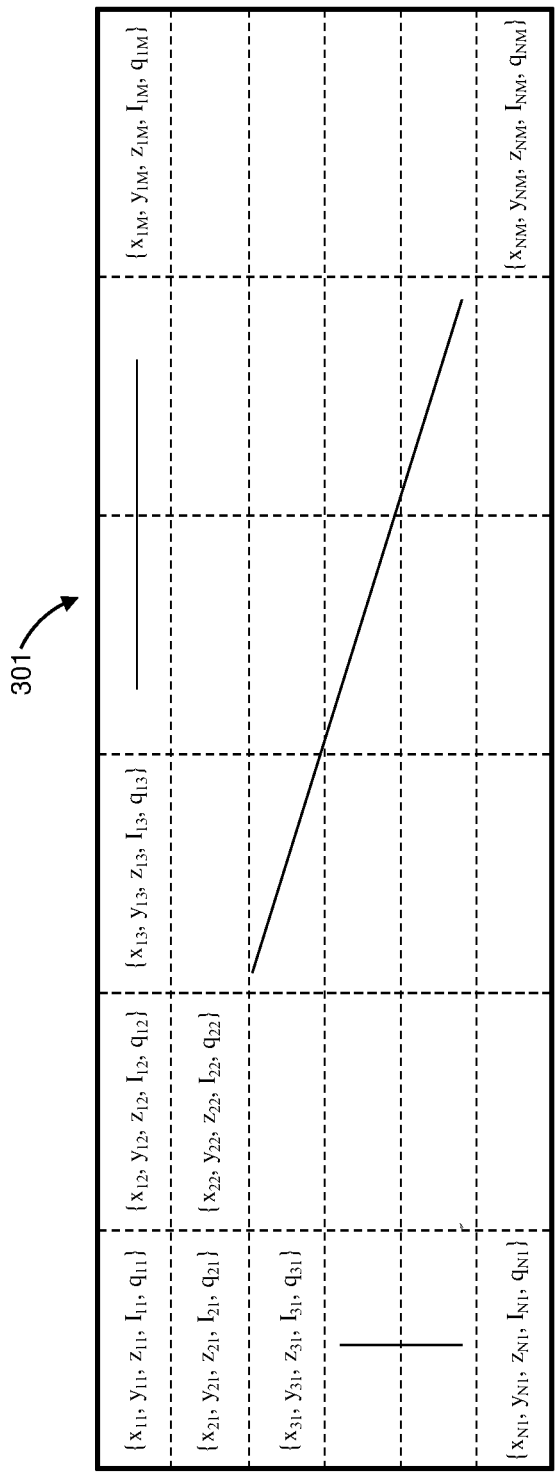
FIG. 3 shows an example of a point cloud matrix in an embodiment described herein.

In addition to the three-dimensional coordinates {x, y, z} and intensity values I, each element in the point cloud matrix 705 includes a value for the quality parameter q, as shown in FIG. 3 earlier. In the present embodiment, the value q is determined based on the standard deviation of the observed intensities in the respective camera pixel $I_n$ (i,j) seen as the three different illumination patterns 703*a*, 703*b*, 703*c* are projected on the object. In another embodiment, the value q is determined based on the difference between the maximum value of intensity and minimum intensity in that pixel across the sequence of images. In this way, the quality parameter defines a measure of the contrast seen in each pixel across the sequence of images.

In the next stage of the process, the exposure settings are adjusted by expanding the size of the camera aperture, as reflected by the circle 707, thereby increasing the amount of light from the object that will reach the camera. A second sequence of 2D images is captured, with the illumination patterns 709*a*, 709*b*, 709*c* again being varied for each image in the sequence. The second sequence of 2D images is used to compute a second input 3D image point cloud 711 that records the depth information for each element, together with an intensity value and a value for the quality parameter q. Owing to the difference in exposure between the first sequence of images and the second sequence of images, it is likely that the degree of contrast seen in a given pixel element {i, j} will vary across the two sequences of images; for example, the difference between the maximum intensity level and minimum intensity level detected in a given pixel element {i, j} will vary between the two sets of images. Accordingly, the values of q recorded in the first point cloud matrix 705 will likely differ from the values of q in the second point cloud matrix 711.

In a further step, the exposure settings are further adjusted by expanding the size of the camera aperture as shown by circle 713. A third sequence of 2D images is captured on the camera, with the illumination patterns 715*a*, 715*b*, 715*c* being projected onto the object. The third sequence of 2D images is used to compute a third input 3D image point cloud matrix 717, which again records the depth information for each element, together with an intensity value and a value for the quality parameter q. As in the case of the first and second point cloud matrices, the difference in exposure between the second sequence of images and the third sequence of images means that it is likely that the degree of contrast seen in the same pixel element {i, j} will vary across the second and third sequences of images. Thus, the values of q recorded in the third point cloud matrix 717 will likely differ from both the first point cloud matrix 705 and the second point cloud matrix 711.

Having computed the point cloud matrices for each sequence of images, the method proceeds by using the data in the respective point cloud matrices to compile a single output point cloud matrix 719, which can then be used to render a 3D representation of the object.

Figure 7:
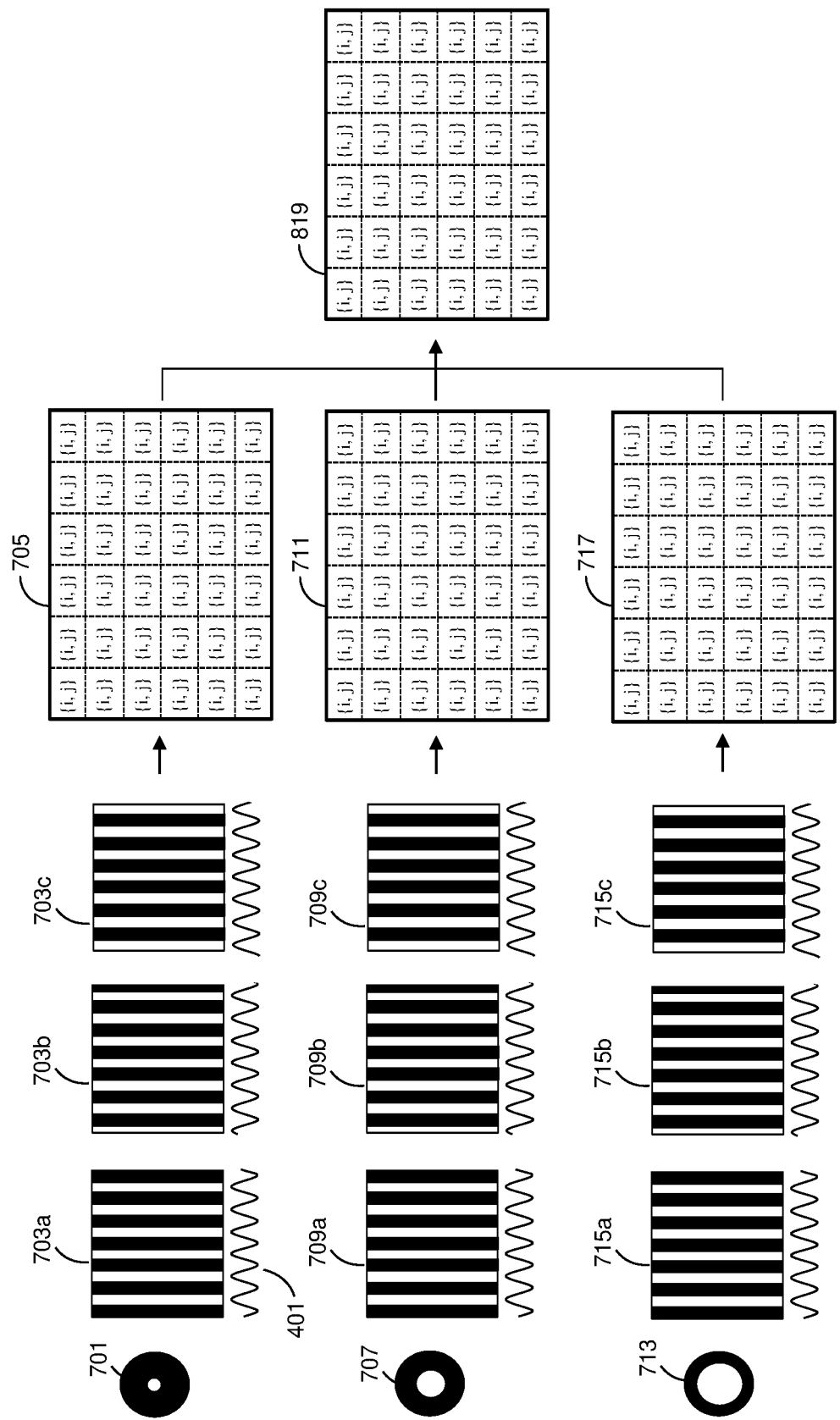
FIG. 7 shows a schematic of how multiple input point cloud matrices may be obtained using the imaging system of FIG. 5 and used to generate a single output point cloud matrix.

It will be understood that, whereas the example shown in FIG. 7 includes a total of three input sequences of images, this is by way of example only and the output point cloud matrix may be computed by capturing any number N of point clouds, where N>=2. Similarly, whilst in the above described example the exposure was varied by increasing the size of the camera aperture in-between capturing each sequence of images, it will be readily understood that this is not the only means by which the exposure may be varied— other examples of ways in which the exposure may be varied include increasing the illumination intensity, increasing the camera integration time, increasing the camera sensitivity or gain, or by varying the strength of an neutral density filter placed in the optical path between the object and the camera.

As previously discussed, whilst the example shown in FIG. 7 includes the step of generating individual point clouds for each set of acquired image data, it will be understood that this is by way of example only and in some embodiments, the output point cloud may be generated without the need to construct the individual point clouds for each set of image data. In such cases, the values for the quality parameter associated with the pixels in each respective set of image data may be deduced from the signal levels detected in those pixels, as well as the amount of ambient light incident on the image sensor.

By capturing multiple sets of image data with different groups of exposure settings, and combining the data from those data sets to provide a single output 3D image, embodiments as described herein can help to compensate for the limits in dynamic range of the camera, providing an enhanced signal to noise ratio for both darker and brighter points on the object surface. In so doing, embodiments can help to ensure that useable data is captured from areas that would, if using conventional methods of 3D surface imaging, be either completely missing from the final image or else dominated by noise, and can ensure that the surface topography of the object is mapped with greater accuracy compared with such conventional methods of 3D surface imaging.

Figure 8:
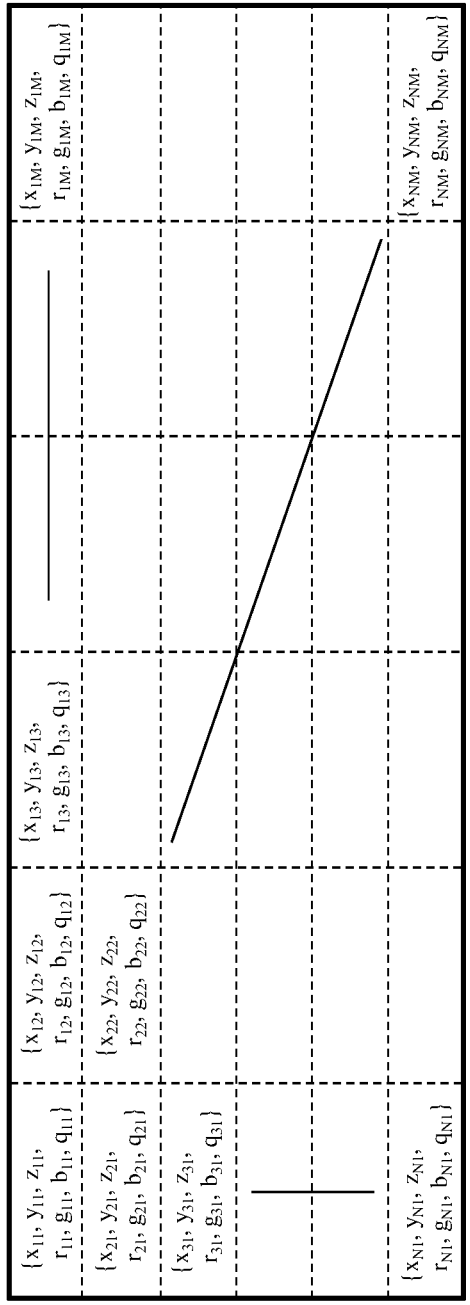
FIG. 8 shows an example of a point cloud matrix in an embodiment described herein

In the embodiments described above, it has been assumed that the camera sensor is imaging in grayscale; that is, a single intensity value is measured in each pixel, relating to the total light level incident on the sensor. However, it will be understood that embodiments described herein are equally applicable to color imaging scenarios. For example, in some embodiments, the camera sensor may comprise an RGB sensor in which a Bayer mask is used to resolve the incident light into red, green and blue channels; in other embodiments, the camera sensor may comprise a three-CCD device in which three separate CCD sensors are used to collect the respective red, blue and green light signals. In this case, the point cloud matrices will be acquired in the same manner as in the above described embodiments, but within each matrix element, the intensity values $I_{ij}$ will be decomposed into the three colour intensities $r_{ij}$, $g_{ij}$, $b_{ij}$. FIG. 8 shows an example of such a point cloud matrix.

As previously discussed, the data used for rendering the final 3D image may be obtained by varying one or more exposure settings, including the illumination intensity, camera integration time (exposure time), increasing the camera sensitivity or gain, or by varying the strength of an neutral density filter placed in the optical path between the object and the camera, for example. There will thus exist a large number of combinations of different settings that can be used for any one exposure. Some of these combinations may offer a more optimal solution than others. For example, in some cases, it might be desirable to choose a group of exposure settings that will minimise exposure time; in other cases, there may be additional or different considerations, such as a need to keep the size of the aperture constant to avoid changes in depth-of-field, which will impose other constraints in terms of which parameters of the imaging system are varied, and by how much. In general, when acquiring an image, it will usually be necessary to strike a balance between achieving an acceptable SNR in the image (in particular, the noise in the depth values for each point on the surface of the object being imaged), and one or more exposure requirements, such as (i) the overall duration of the acquisition, (ii) the illumination intensity required for the acquisition, (iii) the aperture size etc.

It should be noted that 3D measurement systems employing active illumination (e.g. structured light, laser triangulation, time-of-flight) differ from regular cameras in that the amount of ambient light highly influences the dynamic range of the system if a desired maximum noise level is to be achieved. This means that traditional auto-exposure algorithms cannot be used directly—they typically optimize only for that the total signal level is sufficient, whilst active 3D measurement systems instead must enforce a correct ratio between emitted light and ambient light whilst simultaneously avoiding saturation. Finding good exposure sets manually, meanwhile, is a complex endeavour, as they require the user to have a complete mental model of the camera and its parameter sets.

It is desirable, therefore, to provide a means for determining which exposure settings to vary, and by how much, in order to optimize the data quality for a given scene or object. As discussed above in relation to FIG. 5B, the improvement in noise for any given pixel will fall off as the contrast increases beyond a certain point. Embodiments described herein can use this fact that to determine a suitable set of exposure settings, against the backdrop of one or more imaging constraints (e.g. a maximum overall exposure time, maximum aperture size, etc.)

In more detail, we can specify a target in terms of the value of the quality parameter to be obtained for pixels in the final 3D image, where that target is to be achieved subject to one or more imaging constraints. The goal is to try to optimize the final 3D image in terms of noise, whilst imposing one or more constraints ("costs") such as a maximum total exposure time, or total illumination power, for example.

We can begin by defining an exposure cost $E_{Cost}$ that is a function of one or more exposure settings of the system, where the exposure settings in questions are ones that dictate the amount of light that is incident on the camera:

$$E_{Cost} = f_1(\text{exposure time}) + f_2(\text{aperture size}) + f_3(\text{neural density filter strength}) + f_4(\text{illumination intensity}) + \ldots$$

Here, the functions $\{f_1, f_2, \ldots f_n\}$ define how the cost of the exposure varies with each respective parameter. The functions can be user-defined and effectively define the "downside" to the user in varying each parameter. As an example, if it is desirable to capture a 3D image in a very short space of time, then the user may apportion a high cost to exposure time. In another example, if the user is not time-limited, but wishes to keep the overall power usage to a minimum, they may apportion a high cost to illumination intensity. The value of $E_{Cost}$ can be used to provide a constraint in determining the optimum exposure settings for a given acquisition.

We can also define the term $E_{value}$ as an exposure value that indicates how much light that reaches the sensor, both in terms of ambient light and light from the sensor system itself:

$$E_{value} = e_1(\text{exposure time}) \cdot e_2(\text{aperture size}) \cdot e_3(\text{neural density filter strength}) \cdot e_4(\text{illumination intensity}) \cdot \ldots$$

$E_{value}$ serves to incorporate numerous effects that will affect how much signal is received by the camera, and thus the quality of each individual pixel in the system. $E_{value}$ can also be extended such that it returns two exposure values—one indicating the exposure value for the ambient light ($E_{ambient}$) and one indicating the exposure value for the projected light ($E_{amplitude}$).

We can further determine relationships between the functions $\{e_1, e_2, \ldots e_n\}$ where the relationship between each pair of functions defines the extent to which modifying one parameter will alter the amount of light incident on the camera, relative to modifying the other parameter. As an example, in terms of increasing the amount of light incident on the camera, the step of doubling the exposure time may be equivalent to doubling the aperture size. In another example, in terms of increasing the amount of light incident on the camera, the step of doubling the aperture size may be equivalent to reducing the neural density filter strength by a factor of 4. The functions $\{e_1, e_2, \ldots e_n\}$ may be defined so as to take these relationships into consideration.

The functions $\{e_1, e_2, \ldots e_n\}$ and the relationships between them may be determined empirically offline by experiment. Knowledge of the relationships between these functions is useful because it can allow one to translate a change in one parameter value to other parameter values; for example, in the event that one is seeking to achieve a particular value for $E_{value}$, and is able to determine a change in exposure time that will achieve that $E_{value}$, it becomes possible to translate that change in exposure time into a change in the size of the aperture that will then have the same effect in terms of $E_{value}$. As will become apparent below, this is advantageous because it can simplify the determination of the exposure settings for an acquisition by focusing on one parameter only (typically, the exposure time), and then translating the change(s) in exposure time into values of the other parameters according to the user's particular needs (e.g. a desire to minimize overall exposure time versus a desire to minimize aperture size etc.).

In what follows, we provide two examples of how the exposure settings may be determined, based on the values $E_{value}$, $E_{Cost}$ and $q_{min}$, where $q_{min}$ is the minimum acceptable value of the quality parameter.

In the first example, we set the target of finding exposure settings for each image, where those exposure settings will maximize the number of pixels with quality parameter value $q(p) > q_{min}$ in the final image, subject to the condition that the sum of the exposure costs across the sequence of exposures is less than a predefined maximum cost $E_{Cost_{max}}$. In other words, given a set of n exposures, in which each exposure i is acquired with a group of exposure settings having an associated exposure cost $E_{Cost_i}$, we wish to find a set of exposures that will maximize the total number of pixels for which $q(p) > q_{min}$ in the final image subject to the condition that: $\Sigma_i^n E_{Cost_i} \leq E_{Cost_{max}}$, or where the ratio of number of pixels for which $q(p) > q_{min}$ versus $\Sigma_i^n E_{Cost_i}$ is maximized.

As a second example, we set a target of finding a set of exposure settings for each image that will minimize the sum of the exposure costs across the sequence of exposures, whilst ensuring that a threshold number of pixels in the final 3D image will have a quality parameter value $q(p) > q_{min}$.

In what follows, we will discuss different strategies for satisfying these targets. In each case, we can restrict the target to use a particular 2D or 3D region of a given scene.

Figure 9:
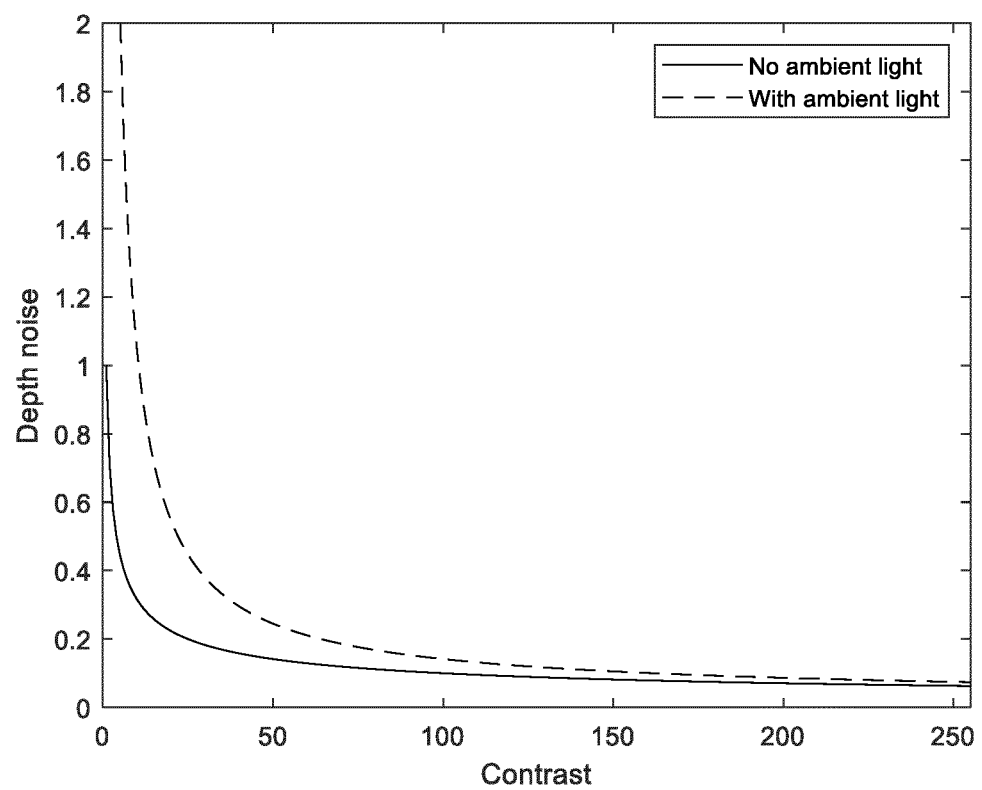
FIG. 9 shows a graph of how the depth noise for a point in a 3D image varies as a function of the contrast obtained in a sequence of images used to generate the 3D image.

For many 3D measurement systems, there is a roughly $(\sqrt{c})^{-1}$ relationship between the received contrast/signal c and the noise. Contrast indicates the amplitude/signal level of the active illumination employed by the camera system. Furthermore, the ambient light also influences the amount of light incident in the camera. The contrast is typically related to how much light is collected; as an example, doubling the exposure time is likely to double the contrast (and the ambient light). Referring to FIG. 9, it can be seen that there is almost a "plateau" when the contrast exceeds a certain value (e.g. 50) where the measurement noise does not improve significantly with contrast. Furthermore, for many applications there is a fixed limit on what level of noise that can be tolerated (e.g. 0.15 mm). In the exposure reflected in FIG. 9, for example, exposures with contrast exceeding 40 could be considered to be "good enough". It can also be seen that the minimum contrast that can be tolerated also depends on the amount of ambient light present.

Referring back to the illustration in FIG. 5B, the distance uncertainty of a point $\sigma_{SL}$ being measured by structured light system can be estimated using the following formula:

$$\sigma_{SL} = \frac{D^2}{B} \frac{\sin(\theta_c)}{\sin(\theta_p)} \frac{FOV}{\phi_{max}} \frac{\sqrt{A+2C}}{A}$$

Where D is the distance to the point being measured, B is the camera-projector baseline, and $\theta_c$ and $\theta_p$ are the camera angle and projector angle, respectively. The value FOV is the field-of-view of the projector, $\phi_{max}$ is the number of sine waves projected, A is the amplitude of the observed sinewaves and C is the fixed light signal received i.e. the ambient illumination+DC level of the emitted sine wave (Bouquet, G., et al, "Design tool for TOF and SL based 3D cameras," Opt. Express 25, 27758-27769 (2017), the content of which is incorporated herein by reference).

There is, however, also the issue of sensor saturation. If we define $S_{max}$ as the maximum signal level the sensor can accommodate without saturating, then when $A+C>S_{max}$, $\sigma_{SL}$ will quickly deteriorate. There will be first a drop in quality when only parts of the sine wave can be recovered, a further drop when only the Gray code part of the code can be deciphered, followed by a complete loss of information once the sensor is fully saturated. It will be appreciated that when capturing data with multiple exposure settings, one does not have to always capture both Gray Codes and the Phase images/sine waves. As the Gray codes are more robust to saturation, one can capture the Gray Codes using one exposure setting, and use that Gray code combined with phase images captured at multiple exposure settings. This saves time, as one saves the effort required of multiple Gray code recaptures.

In order to take into account the possibility of saturation, the previous equation can be rewritten as:

$$\sigma_{SL} = \begin{cases} \frac{D^2}{B} \frac{\sin(\theta_c)}{\sin(\theta_p)} \frac{FOV}{\phi_{max}} \frac{\sqrt{A+2C}}{A}, & A+C < S_{max} \\ \infty, & A+C > S_{max} \end{cases}$$

It should be noted that in most cases, B and FOV can be considered to be constants.

As noted above, the exposure cost $E_{Cost}$ for a particular image acquisition is modelled as a function of different parameters, each on which will affect the amount of light incident on the camera. For simplicity, in what follows, we will assume that each of these parameters is kept constant, except for the exposure time, such that $E_{Cost}=t$ for a length of exposure t.

We can then formulate the following equations:

$$A'(p) = t A^*(p)$$

$$C'(p) = t C^*(p)$$

where A'(p) indicates the measured amplitude of a point p in the image, C'(p) indicates the measured ambient light of the point p, A*(p) is the exposure time independent amplitude of the point p and C*(p) is the exposure time independent ambient light of the point p.

We can think of A* and C* as normalized values in some unit of time. A* and C* can be described using the following:

$$A^*(p) = v^+(p) - v^-(p)$$

$$C^*(p) = v^-(p)$$

where for each pixel p, $v^+(p)$ is a pixel signal level with the system's active illumination on (projector on for structured light), and $v^-(p)$ is a pixel signal level with the system's illumination off.

The predicted noise of the system is then given by:

$$\sigma_{SL} = \frac{D^2}{B} \frac{\sin(\theta_c)}{\sin(\theta_p)} \frac{FOV}{\phi_{max}} \frac{\sqrt{v^+(p) + v^-(p)}}{v^+(p) - v^-(p)}$$

When considered per pixel p this yields:

$$\sigma_{SL}(p) = \frac{D^2}{B}\frac{\sin(\theta_c)}{\sin(\theta_p)}\frac{FOV}{\phi_{max}}\frac{\sqrt{v^+(p)+v^-(p)}}{v^+(p)-v^-(p)} = \frac{D^2}{B}\frac{\sin(\theta_c)}{\sin(\theta_p)}\frac{FOV}{\phi_{max}}\frac{\sqrt{v^+(p)+v^-(p)}}{v^+(p)-v^-(p)}$$

We can simplify the expression for $\sigma_{SL}$ to:

$$\sigma_{SL}(p) = X\frac{\sqrt{v^+(p)+v^-(p)}}{v^+(p)-v^-(p)}, X = \frac{D^2}{B}\frac{\sin(\theta_c)}{\sin(\theta_p)}\frac{FOV}{\phi_{max}}$$

For the purpose of establishing the values of the exposure time, we can define the quality parameter q as $$q = \frac{1}{\sigma_{SL}}.$$

The desired outcome for $q > q_{min}$ can then be reformulated as $\sigma_{SL} < \sigma_{max}$. This means that each pixel will have a minimum time $t_{min}$ that is required for sufficient exposure of that point on the object. It can be seen that the necessary $t_{min}$ depends not only on ambient light, but also the distance to object D and the position in scene as determined by the angles $\theta_c$ and $\theta_p$. Depending on the implementation, these variables can be kept constant or reflect the actual per-pixel data.

Due to the effect of oversaturation (where $\sigma_{SL} >> \sigma_{max}$), there is also a time $t_{max}$ that defines the maximum time that a pixel can be exposed without experiencing saturation. In reality this means that for some pixels it will be impossible to satisfy $\sigma_{max} > \sigma_{SL}$ as this would require signal levels A and C that would saturate the sensor. This could e.g. happen if the sensor system is used outdoors in sunlight or in the presence of strong light sources. In such cases, the built-in illumination would not be able to drown out the ambient light.

The values of $t_{min}$ and $t_{max}$ for each pixel can be determined in a number of ways. In a first example, the values are predicted from captured images as follows.

Assume that we have captured an image $I(t_0)$ by using an exposure time $t_0$ and containing a pixel $p_0$ with $v^+(p_0)$ and $v^-(p_0)$. Under the assumption of $p_0$ not being fully oversaturated, or too under-saturated, we can then use the following formulas to predict $t_{min}$ and $t_{max}$ for that pixel:

$$t_{max}(p_0) = \frac{t_0 S_{max}}{v^+(p_0)}$$

whilst $$\sigma_{max}(p_0) = X\frac{1}{\sqrt{t_{min}}}\frac{\sqrt{v^+(p_0)+v^-(p_0)}}{v^+(p_0)-v^-(p_0)}$$

yielding $$t_{min}(p_0) = \left(X\frac{\sqrt{v^+(p_0)+v^-(p_0)}}{\sigma_{max}(v^+(p_0)-v^-(p_0))}\right)^2$$

If the pixel captured is oversaturated, no prediction can be done other than that $t_{max} < t_0$. If the pixel captured is under-saturated (e.g. contrast close to zero), no prediction can be done other than that $t_{min} > t_0$. For under-saturation, there will, however, be a range of responses where predictions of $t_{min}$ and $t_{max}$ can be predicted (whilst $\sigma_{SL}(p_0) > \sigma_{max}$).

Interestingly, there will exist situations where $t_{min} > t_{max}$. This means usually in practice that the active illumination of the system is too weak to overcome the ambient illumination to allow for imaging with sufficiently high quality. This might not be over the entire scene, e.g. the surface normal of the imaged object and its specular characteristics may be unfavourable for the setup.

In a first example, we capture a set of candidate images $I_{init} = \{I_1, I_2, \ldots I_n\}$ with different exposure settings $i_{init} = \{E_1, E_2, \ldots E_n\}$. Note that, since we are only considering the exposure time in the present case, $E_{init} = \{t_1, t_2, \ldots t_n\}$. We then determine which subset of these images—and hence, candidate exposure times—offers the best result in terms of maximising the number of pixels in the final 3D image with an acceptable noise level, whilst satisfying the constraint that the total time taken is less than $T_{max}$ (it will be appreciated here, that since $E_{Cost}$ is expressed purely in terms of the exposure time, the value $T_{max}$ effectively corresponds to $E_{Cost_{max}}$ in this example).

In the present example, in order to quickly evaluate the amount of well-exposed pixels using exposure times from a candidate exposure taken from $I_{init}$ we can use the following histogram-based approach. Given one or more images from $I_{init}$, we compute $t_{min}$ and $t_{max}$ for each pixel. We assume that $I_{init}$ covers the whole dynamic range of the scene (typically around 7 stops) so that we can estimate the values of $t_{min}$ and $t_{max}$ for most of the pixels. For each pixel p, there could be several images $I_{good}^p \subset I_{init}$ which give good estimates for $t_{min}$ and $t_{max}$ for p. We compute these values by either picking some I from $I_{good}^p$ or by averaging $t_{min}$ and $t_{max}$ from the whole set $I_{good}^p$. Next, we create a 2D histogram H. This is a k×k matrix where both each row $x \in [0, k-1]$ and column $y \in [0, k-1]$ represent exposure times in the range $[x\Delta_t, (x+1)\Delta_t]$, where:

$$\Delta_t = \left[\frac{T^*}{k}\right]$$

and T* is the largest time bin under consideration.

We define each value H(x, y) as the number of pixels for which $t_{min}$ is in the x-th row and $t_{max}$ is in the y-th column:

$$H(x,y) = \{p_i | t_{min}(p) \in [x\Delta_t, (x+1)\Delta_t] \text{ and } t_{max}(p) \in [y\Delta_t, (y+1)\Delta_t]\}$$

The histogram allows us to estimate, for a given exposure time $t \in [0, T^*]$, the number of pixels $N_{good}$ that will be well-exposed using t by:

$$N_{good} = \sum_{y=idx(t)}^{k-1} \sum_{x=0}^{idx(t)} H(x, y)$$

Where idx(t) is the row/column number corresponding to t:

$$idx(t) = \left[\frac{t}{\Delta_t}\right]$$

Note that this holds for any exposure time in [0, T*] and not just those in $I_{init}$.

Figure 10:
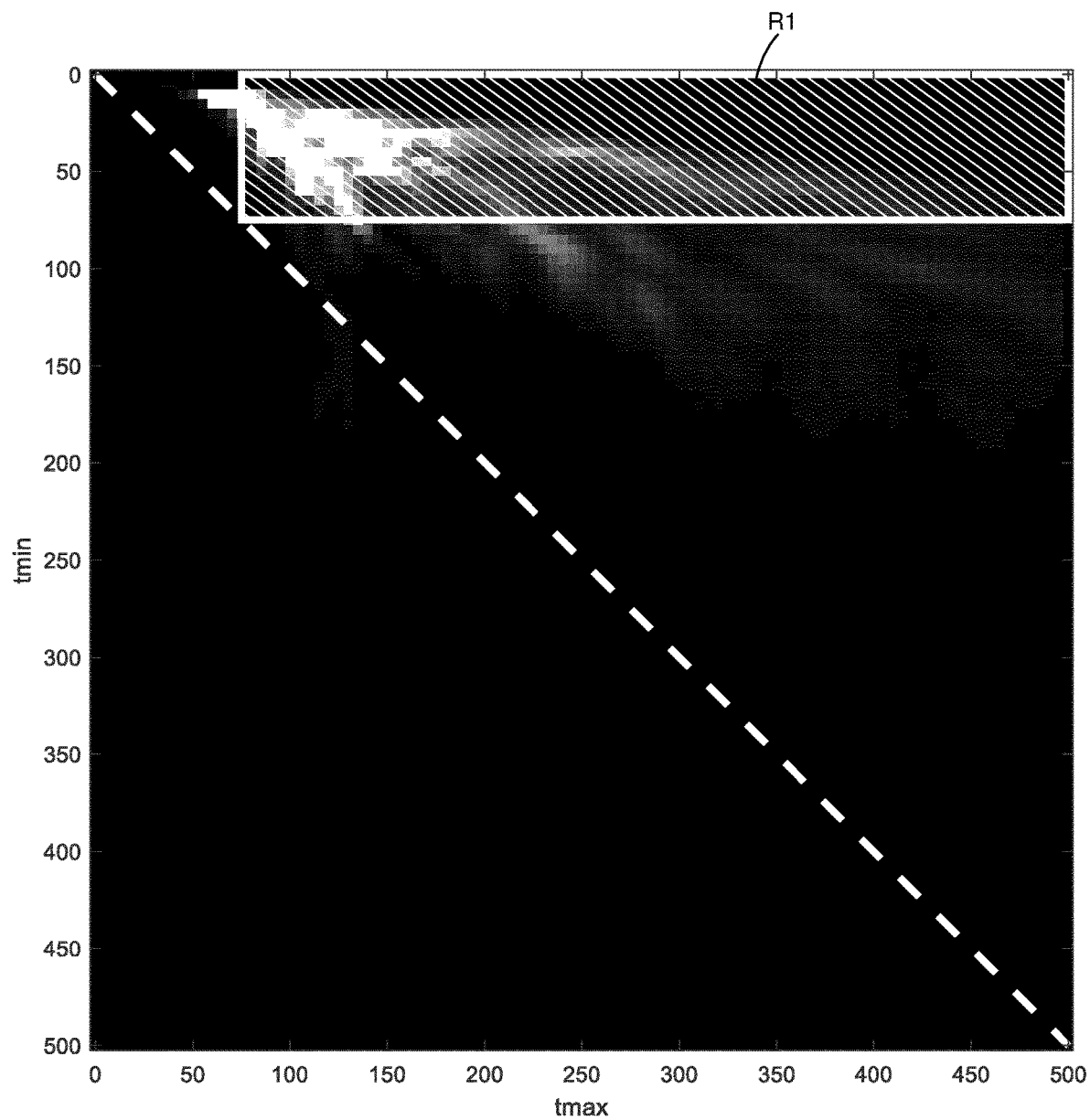
FIG. 10 shows a histogram of the number of well-exposed pixels in an image for different candidate exposure times.

An example of such a histogram is shown in FIG. 10. Here, exposure times are given in milliseconds with $\Delta_t=5$ ms. The x-axis represents $t_{min} \in (0, 500)$ and the y-axis represents $t_{max} \in (0, 500)$. The region labelled R1 contains the values of H that should be summed to obtain $N_{good}$ for a given t'=105 ms (as represented by a point on the diagonal); in other words, the region R1 contains all pixels p for which $t_{min}(p) \in (0, t')$ and $t_{max}(p) \in (t', T^*)$.

Given a set of exposure times in increasing order E'={$t_0$, $t_1$, ...}, we can estimate:

$$N_{good}(E') = \sum_{y=idx(t)}^{T^*} \sum_{x=0}^{idx(t_0)} H(x,y) + \sum_{y=idx(t)}^{T^*} \sum_{x=idx(t_0)+1}^{idx(t_1)} H(x,y) + ...$$

Figure 11:
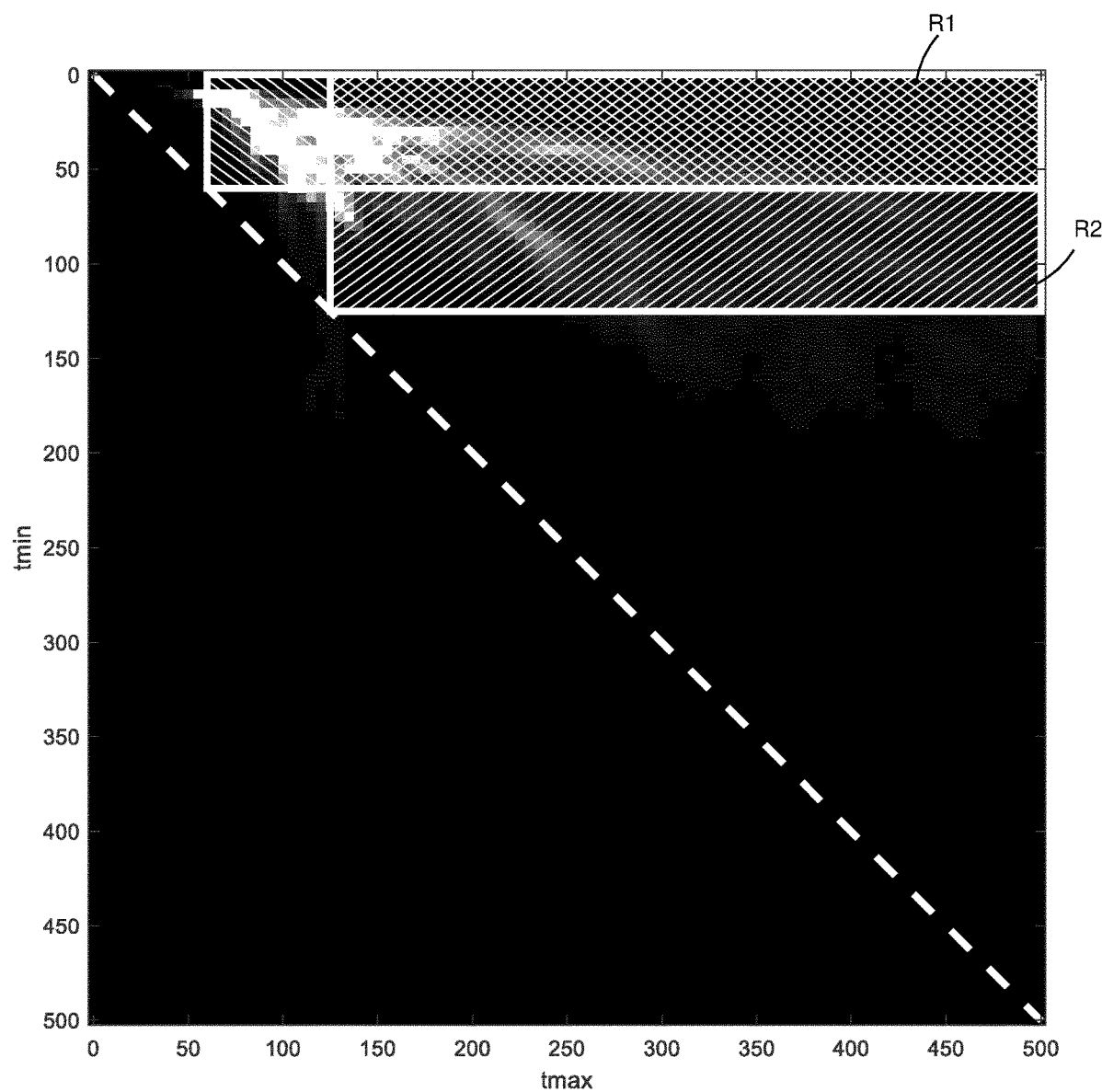
FIG. 11 shows a histogram of the number of well-exposed pixels in an image for different candidate exposure times.

This is illustrated in FIG. 11. Since the rectangles R1 and R2 overlap, the above formula avoids counting histogram bins twice.

To further speed up the process we can use the cumulative histogram $$H_c(x,y) = \sum_{x'<x, y'<y} H(x,y)$$

We can then use the following formula to quickly compute $N_{good}$ for the complete set of exposures (i.e. to compute the cumulative sum of pixels that have an acceptable level of noise in at least one of the captured images):

$$N_{good} = \sum_{y=c}^{d} \sum_{x=a}^{b} H(x,y) = H_c(b+1, d+1) + H_c(a,c) - H_c(b+1, c) - H_c(a, d+1)$$

This approach allows us to quickly compute $N_{good}(t)$ using just the sum of four numbers.

We can use the above approach for determining $N_{good}$ to find a set of exposure times that will satisfy the first target, i.e. that will maximize the number of pixels with quality parameter value $q(p)>q_{min}$ in the final image, subject to the condition that the sum of the exposure times across the image is less than $T_{max}$.

In one example, we can use a "greedy" algorithm as follows:

We set: $E_{opt}=\emptyset$

While total time of $E_{opt}$ is less than $T_{max}$:

Find $E \in E_{init}$ that maximizes the number of pixels with $q(p)>q_{min}$ for the set of exposures $E_{opt} \cup E$. This can be found quickly by using the histogram approach as discussed above;

Add E to $E_{opt}$ and remove E from $E_{init}$

Figure 12:
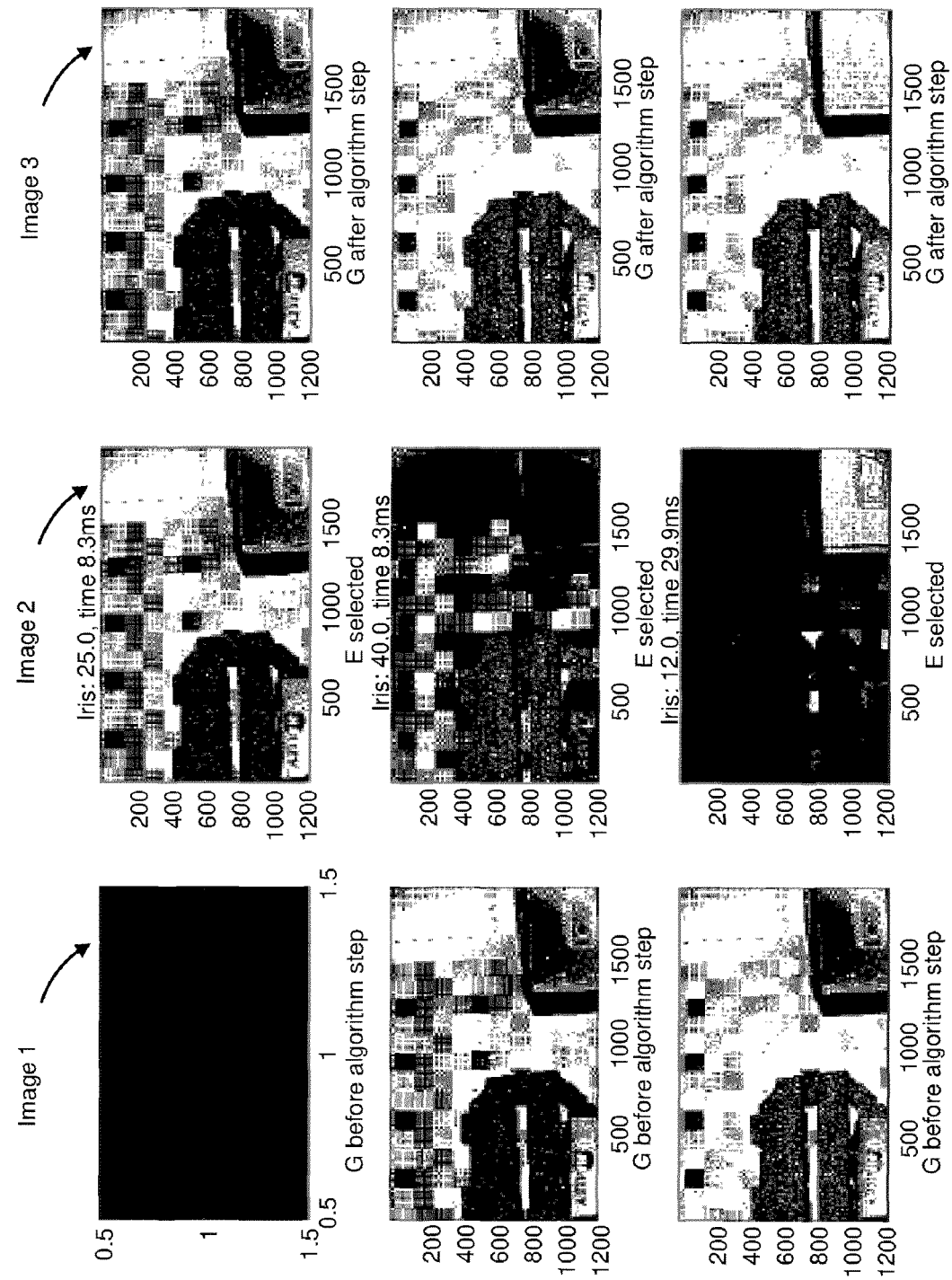
FIG. 12 shows a series of images representing the number of well-exposed pixels obtained from cumulative exposures of the image sensor.

FIG. 12 shows the results after each round in the algorithm, with each row showing one cycle in the while-loop. After each step, we estimate G where G is a binary image that is true for all pixels that are well exposed for the exposures contained in $E_{opt}$. The initial image for G (image 1) is completely black since no pixels are known to have an acceptable value of q. Then, the first exposure is selected for the scene with the maximum number of good pixels ($q>q_{min}$) (see image 2). This provides an updated G (image 3). In the next round, the updated image G is used as a basis, and a new E is selected as being the one that provides the maximum amount of additional well-exposed pixels. This then results in a further updated image for G.

In the case where the cost is defined as a function of multiple ones of the imaging parameters (and not just the exposure time), the algorithm will run until the sum of costs for the chosen set of exposures exceeds $E_{cost_{max}}$ instead of until the sum of exposure times exceeds $T_{max}$. In more detail, having determined a candidate group of exposure settings, one can determine the value $E_{value}$ for that group of exposure settings, and use this to translate to/generate one or more alternative candidate groups of exposure settings for which the value of $E_{value}$ is the same; this can be achieved by considering the functions {$e_1, e_2, ..., e_n$} as discussed earlier. As an example, one might identify a candidate group of exposure settings in which the exposure time is $t_1$ and the aperture size is $a_1$. One can then convert this to a second group of exposure settings in which the exposure time is $t_2$ and the aperture size is $a_2$ and where $t_2>t_1$ and $a_2<a_1$. These two alternatives should then provide similar outcomes in terms of the light that is collected from light and dark regions of the object being imaged. However, the two alternatives may have very different costs depending on whether the user places greater importance on keeping the overall exposure time as short as possible, or keeping the aperture size as small as possible (in other words, depending on the functions $I_i$ and $f_2$ in $E_{Cost}$).

The greedy algorithm can be easily modified to meet the second target i.e. to find a set of exposure settings for each image that will minimize the total exposure cost across the sequence of exposures, whilst ensuring that a threshold number of pixels in the final 3D image will have a quality parameter value $q(p)>q_{min}$.

We set: $E_{opt}=\emptyset$

While the total number of pixels for which $q(p)>q_{min}$ in $E_{opt}$ is less than $N_{min}$:

Find $E \in E_{init}$ that maximizes the number of pixels with $q(p)>q_{min}$ for the set of exposures $E_{opt} \cap E$. This can be found quickly by using the histogram approach as discussed above;

Add E to $E_{opt}$ and remove E from $E_{init}$

It will be appreciated that in selecting the optimal set of exposure times, we need not be limited to only selecting exposure times that were present in the initial sequence of captured images $I_{init}$. The histogram representation allows us to make use of the exposure times corresponding to each respective time bin in the histogram, and not just the exposure times $t_i \in E_{init}$. Given H(x,y), we can quickly compute a set of optimal exposure times as follows (here we will revert to the first target of maximizing the number of pixels with quality parameter value $q(p)>q_{min}$ in the final image, subject to the condition that the sum of the exposure times across the image is less than $T_{max}$).

Let $\hat{t}_i$ be a discretized exposure time corresponding to a row/column in the histogram H. Let $\hat{t}_a$ be a maximum time such that at time $\hat{t}_a$ there are no pixels with $t_{min}<\hat{t}_a$ (lower bound for acceptable exposure times). Similarly, let $\hat{t}_b$ be a minimum time at which there are no pixels with $t_{max}>\hat{t}_b$ (upper bound for acceptable exposure times). Let $\hat{T}$ be the set of acceptable discretized exposure times, $\hat{T}=\{\hat{t}_i | \hat{t}_i \in (\hat{t}_a, \hat{t}_b)\}$, sorted in increasing order.

To determine an optimal set of exposure times, we proceed as follows:

Identify all possible subsets $\hat{T}'$ of $\hat{T}$ that have a total time less than $T_{max}$. This can be achieved as follows. Let $|\hat{T}|=n$, we can assume that n is relatively small since it makes no sense to have less than e.g. ⅓ stops between exposures. To quickly generate all subsets that have a total time less than $T_{max}$ we can map all times $t_i \epsilon t_i \epsilon \hat{T}$ to integers k where k=1, 2, . . . , n. Then for each integer k, we list all possible distinct partitions. For example:

1={1}
2={2}
3={3}, {1+2}
4={4}, {3+1}
5={5}, {4+1}, {3+2}
6={6}, {5+1}, {4+2}, {3+2+1}

In the case of using the cost-based approach, we can identify all possible subsets I" of that have a total cost less than $E_{cost_{max}}$ as basis for the algorithm.

For each integer k, the partition results in a group of subsets of $\hat{T}$ with total time $\hat{t}_k$. Then, all subsets with a total time≤$T_{max}$ corresponds to partitioning of all integers k<$k_{max}$ where $k_{max}$ is a mapped value of $\hat{t}_i$ closest to $\hat{T}_{max}$. The partitioning can be generated in a bottom-up manner or recursively. As an example, in Python code, one can use the following sequence of commands to generate the subsets recursively:

```
def uniquepartitions (n, I=1);
    yield (n,)
    for i in range (I, n//2+1):
        for p in unique_partitions(n–I, i):
            if i not in p: #eliminate non-unique results
                yield (i,)+P
```

The bottom up approach is straightforward using dynamic programming. Moreover, we can obtain a pre-computed table of all such partitioning up to some large value of k.

Having obtained each subset $\hat{T}$', we can compute $N_{good}$ ($\hat{T}$') and select the subset $\hat{T}$" having the largest value of $N_{good}$. Note that the value of $N_{good}$ can be computed quickly for each subset using the cumulative histogram approach as discussed above.

The previous examples have been discussed in the context of capturing an initial sequence of images, and thereafter determining the best exposure settings for the image acquisition. Thus, in the previous examples, the candidate groups of exposure settings are determined offline, such that each group of exposure settings to be used in the 3D image acquisition process is determined prior to acquiring the respective sets of image data. In what follows, we describe an online approach for choosing optimal exposure settings. Here, we assume that we are given an initial exposure(s) and the aim is to predict the next best exposure. Thus, in the present online approach, the 3D image acquisition process is carried out iteratively, by determining in each iteration, a next best group of exposure settings to use and then capturing a set of image data with that group of exposure settings. In each iteration of the method, one or more new candidate groups of exposure settings are considered and a single one of the candidate groups of exposure settings selected for use in acquiring the next set of image data.

We consider an image 40 taken with an exposure time t. For each pixel $p_i \epsilon I(t)$ we denote the pixel signal level with the system's active illumination on (projector on for structured light) as $v^+(p_i)$, and denote the pixel signal level with the system's illumination off as $v^-(p_i)$.

We have several constraints (in the following, the numbers provided are based on the camera sensor being an 8-bit sensor with 256 intensity levels):

$v_{bad}$ maximum value for "black" underexposed pixels (e.g. 10). Those pixels for which v<$v_{bad}$ cannot be guaranteed to increase in value if we increase the exposure time. This will include pixels in a region of shadow, for example.

$v_{min}$, the minimum acceptable pixel value (e.g. 50). A pixel with v∈[$v_{bad}$,$v_{min}$] will increase its value if the exposure time is increased.

$v_{max}$, the maximum acceptable pixel value (e.g. 230). Those pixels for which v>$v_{max}$ are overexposed and it is not possible to estimate a proper exposure time for them.

$\sigma_{max}$, the maximum measurement uncertainty which gives acceptable 3D quality. We estimate σ for each pixel as follows:

$$\sigma(p) \sim \frac{\sqrt{A+2C}}{A} \sim \frac{\sqrt{v^+(p)-v^-(p)+2v^-(p)}}{v^+(p)-v^-(p)} \sim \frac{\sqrt{v^+(p)+v^-(p)}}{v^+(p)-v^-(p)}$$

Given p with σ(p) and time t, we can estimate σ'(p) using time t'=αt as follows:

$$\sigma'(p) = \frac{\sigma(p)}{\sqrt{\alpha}}$$

The algorithm proceeds as follows:
Begin with an initial exposure time and acquire an image
Compute a candidate set of next possible exposure times
For each candidate exposure time, compute the expected number of well-exposed pixels
Pick the exposure time with the greatest expected number of well-exposed pixels
Repeat until a condition is met (e.g. one reaches the maximum allowed time)

A probabilistic model can be used to estimate the number of well-exposed pixels given a set of exposures that has already taken place. Consider an image I(t) taken with an exposure time t. Each pixel $p_i \epsilon I(t)$ may fall into one of the following categories:

Case 1 (impossible): the pixel is properly exposed, but σ(p) is too high. That is:

$$v^-(p) \epsilon (v_{min}, v_{max}), v^+(P) \epsilon (v_{min}, v_{max}), \sigma(p) > \sigma_{max}$$

Since it is not possible to obtain proper measurements from pixels in this category by increasing the exposure time, these pixels are to be dropped from consideration.

Case 2 (acceptable quality): the pixel is properly exposed and 3D measurements at this point have acceptable quality. That is:

$$v^+(p) \epsilon (v_{min}, v_{max}), \sigma(p) < \sigma_{max}$$

These pixels can be dropped from further consideration.
Case 3 (overexposed). There are actually two possibilities here:
(a) The pixel is overexposed even with the projector off; that is $v^-(p) > v_{max}$ In this case, we can do nothing but decrease the ambient light. We increase the probability with $\alpha'_{2\alpha}$ for each exposure stop, but only up until $\alpha'_{2\alpha}$.

$$Pr(\sigma(p) < \sigma_{max} | t > t_i) = 0,$$

$$Pr(\sigma(p) < \sigma_{max} | t < t_i) = \min\left(\alpha_{2\alpha} \log_2\left(\frac{t_i}{t}\right), \alpha'_{2\alpha}\right)$$

(b) The pixel is overexposed with the projector on, but properly exposed with the projector off; that is, $v^+(p) > v_{max}$ and $v^-(p) < v_{min}$. In this case, we should aim to decrease the exposure time. As before:

$$Pr(\sigma(p) < \sigma_{max} | t > t_i) = 0,$$

Suppose we can say that p has $|v^+(p) - v^-(p)| = R$ with some probability $\alpha_{2b}$ if p is properly exposed. This means that if:

$$t' = t_i \frac{v_{max}}{R + v^-(p)}$$

then $v^+(p) = v_{max}$ with probability $\alpha_{2b}$.

We can write:

$$\beta' = \frac{v_{max}}{R + v^-(p)}$$

$$\sigma'(p) = \frac{\sqrt{v_{max} + \beta' v'(p)}}{v_{max} - \beta' v^-(p)}$$

Next, we estimate the extent to which we can reduce t' while still keeping $\sigma(p) < \sigma_{max}$.

Let $t'' = \beta'' t'$, then:

$$\text{If } \beta'' < \left(\frac{\sigma'(p)}{\sigma_{max}}\right)^2, \text{ then } \sigma''(p) > \sigma_{max}$$

This gives us:

$$Pr(\sigma(p) < \sigma_{max} | t \in (\beta''t_i, \beta't_i)) = \alpha_{2b},$$

$$Pr(\sigma(p) < \sigma_{max} | t < \beta''t_i) = 0$$

Case 4 (underexposed). There are three possibilities here:

(a) The pixel is underexposed with the projector on; that is $v^+(p) < v_{bad}$. Here, we need to increase the exposure time. Again, we increase the probability with $\alpha_{3\alpha}$ for each stop, but no more than $\alpha'_{3\alpha}$.

$$P(\sigma(p) < \sigma_{max} | t < t_i) = 0,$$

$$Pr(\sigma(p) < \sigma_{max} | t > t_i) = \min\left(\alpha_{2\alpha} \log_2\left(\frac{t_i}{t}\right), \alpha'_{2\alpha}\right)$$

$$Pr(\sigma(p) < \sigma_{max} | t < t_i) = \min\left(\alpha_{3\alpha} \log_2\left(\frac{t}{t_i}\right), \alpha'_{3\alpha}\right)$$

(b) The pixel is underexposed with the projector on; that is $\sigma(p) > \sigma_{max}$, but $v^+(p) \in (v_{bad}, v_{min})$ We can increase the exposure time to get $v^+(p)$ such that $\sigma(p) < \sigma_{max}$ but also keeping $v^+(p) < v_{max}$ and estimate the probability as follows:

$$Pr(\sigma(p) < \sigma_{max} | t < t_i) = 0,$$

$$Pr\left(\sigma(p) < \sigma_{max} \mid t \in \left(\left(\frac{\sigma(p)}{\sigma_{max}}\right)^2 t_i, \frac{v_{max}}{v^+(p)} t_i\right)\right) = 1,$$

$$Pr\left(\sigma(p) < \sigma_{max} \mid t \in \left(\left(\frac{\sigma(p)}{\sigma_{max}}\right)^2 t_i, \frac{v_{max}}{v^+(p)} t_i\right)\right) = 1,$$

$$Pr\left(\sigma(p) < \sigma_{max} \mid t > \frac{v_{max}}{v^+(p)} t_i\right) = 0$$

(c) The pixel is underexposed with the projector off, that is:

$v^-(p) < v_{min}$, $v^+(p) \in (v_{min}, v_{max})$, $\sigma(p) > \sigma_{max}$. This case is similar to case 4(b) above.

FIG. 13 sets out a general framework for the above-described online approach with examples of possible algorithms for choosing candidate times and estimated the expected number of pixels with an acceptable value for the quality parameter. We use $E = \{(t_i, I(t_i))\}$ as a set of current exposure times along with images. The algorithm uses ComputeExpectedNum to estimate the expected number of pixels for which $\sigma(p) < \sigma_{max}$ given an exposure time t and previous exposures E. It uses the probabilistic model described above, and can be extended by estimating $\alpha_i$ using machine learning techniques (for example, by using values of neighbourhood pixels with a convolutional neural network CNN). The procedure estimates the probability for each pixel based on which one of the above categories the pixel falls into:

Given some $t_i$ with $I(t_i)$

Compute candidate times in a log grid with ⅙ step inbetween $t_i$ and 1 step $< t_{min}, > t_{max}$.

For each candidate time compute expected number of good pixels (using the above).

Pick time with the highest expected number of good pixels.

As before, in the case where the cost is defined as a function of multiple ones of the imaging parameters (and not just the exposure time), the algorithm will run until the sum of costs for the set of exposures exceeds $E_{cost_{max}}$ instead of until the sum of exposure times exceeds $T_{max}$. Another alternative is that the algorithm terminates once the ratio between expected increase in number of new good pixels (the return value from ComputeExpectedNum) versus the exposure cost of the selected exposure falls below a threshold.

It will be appreciated that in the above examples, the change in exposure settings for each image acquisition has been limited to the exposure time only, with the understanding that other parameters (aperture size, illumination intensity, neural density filter strength etc.) remain constant across the sequence of image acquisitions. However, as previously discussed, it is possible to infer from the change in exposure time the extent to which other ones of the parameters would need to be altered in order to achieve the same signal to noise; this can be done by considering the respective functions $\{e, e_2, \ldots, e_n\}$ associated with each parameter. For example, having determined a set of exposure times $\{t_1, t_2, t_n\}$ for a particular acquisition, this can be translated to a set of aperture sizes $\{a_1, a_2, \ldots, a_n\}$ or combinations of both these parameters $\{\{t_1, a_1\}, \{t_2, a_2\} \ldots, \{t_n, a_n\}\}$ by considering the respective functions $\{e_1, e_2, \ldots, e_n\}$ associated with the exposure time and aperture size whilst minimizing their respective costs $\{f_1, f_2, \ldots, f_n\}$. Accordingly, although the algorithms described herein focus on exposure time, the determination of different exposure times can act as a proxy for determining the settings for other parameters that affect the amount of light incident on the camera.

In the case of adjusted projector brightness, this will primarily affect the amplitude of the received signal, and to a much less extent the strength of the ambient light. This can easily be incorporated into the "greedy" algorithm described earlier by simply including images captured with different projector brightnesses into the set, e.g. a discrete set of different brightnesses.

It will further be appreciated that although the specific examples described herein relate to structured illumination systems, the methods described herein can be readily extended to other forms of 3D imaging, by considering how the signal to noise in the final image varies as a function of the received light signal. As an example, for active time-of-flight systems, the following relation exists for the depth noise $\sigma_{TOF}$:

$$\sigma_{TOF} = \frac{1}{2\sqrt{2m}} \frac{c\tau_{response}}{\sqrt{N_{ph}}}$$

Where $N_{ph}$ is the total signal level received (the sum of amplitude A and ambient light C), $\tau_{response}$ is the time response of the system, c is the speed of light and m is the number of samples performed. $\sqrt{N_{ph}}$ can be replaced by the signal to noise ratio (SNR) when including contribution from dark noise and ambient noise. In this case $\tau_{response}$ will usually be a constant (dictated by the characteristics of the components).

It will be appreciated that the above algorithms can be easily constrained to working only on relevant region in the image. This region could be specified in 2D (in pixel coordinates) or in 3D (in world XYZ coordinates). Pixels determined to fall outside the specified region-of-interest, either in 2D or 3D, can then be excluded from further consideration of the algorithms.

In summary, embodiments described herein provide a means for rendering a high SNR 3D image of a scene or object. By carrying out a plurality of image acquisitions with different exposure settings and merging the data from those sets of image data to form a single point cloud in which the signal to noise ratio is maximised for each point, it is possible to accommodate large variations in the amount of light available from different points in the scene. Moreover, embodiments provide a means for determining a set of exposure settings to use in acquiring each image, in a way that will maximise the signal to noise ratio in the final 3D image whilst satisfying one or more constraints on time, depth of focus, illumination power, etc.

It will be appreciated that implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

While certain embodiments have been described, these embodiments have been presented by way of example only and are not intended to limit the scope of the invention. Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The invention claimed is:

1. A method for determining one or more groups of exposure settings to use in a 3D image acquisition process carried out with an imaging system, the imaging system comprising an image sensor and the 3D image acquisition process comprising capturing one or more sets of image data on the image sensor using the respective groups of exposure settings, wherein the one or more sets of image data are such as to allow the generation of one or more 3D point clouds defining the three-dimensional coordinates of points on the surface(s) of one or more objects being imaged, each group of exposure settings including an exposure time to be used when capturing a respective one of the sets of image data, the method comprising:
 (i) identifying, using image data captured on the image sensor, one or more candidate groups of exposure settings;
 (ii) for each candidate group of exposure settings:
  determining an amount of signal likely to be received in different pixels of the image sensor in the event that the candidate group of exposure settings is used to capture a set of image data for use in the 3D image acquisition process,
  determining, based on the amount of signal likely to be received in the different pixels, whether or not the respective pixels would be well-exposed pixels if using the candidate group of exposure settings, wherein a well-exposed pixel is one for which the value of a quality parameter associated with that pixel is above a threshold, wherein the value of the quality parameter for a pixel reflects a degree of uncertainty that would be present in the three dimensional coordinates of a point in a point cloud associated with that pixel, in the event that the point cloud were to be generated using the set of image data captured with the candidate group of exposure settings; and
 (iii) selecting, from the one or more candidate groups of exposure settings, one or more groups of exposure settings to be used for the 3D image acquisition process, the selection being such as to maximize the number of pixels in the set N, wherein a pixel will belong to the set N if there is at least one selected group of exposure settings for which the pixel is determined as being a well-exposed pixel,
 wherein the selection is carried out subject to the constraint that a sum of the exposure times for the selected group(s) of exposure settings is below a predefined threshold.

2. A method according to claim 1, wherein for one or more of the candidate groups of exposure settings, the step of determining an amount of signal likely to be received in different pixels of the image sensor in the event that the candidate group of exposure settings is used to capture a set of image data comprises capturing a set of image data with the candidate group of exposure settings.

3. A method according to claim 2, wherein the set(s) of image data captured when using the one or more candidate groups of exposure settings are used to identify one or more other candidate groups of exposure settings.

4. A method according to claim 1, wherein steps (i) to (iii) are repeated through one or more iterations, wherein for each iteration:
- a single one of the candidate group of exposure settings identified in that iteration is selected; and
- the number of pixels in the set N is maximised subject to the constraint that the sum of the exposure time for the group of exposure settings selected in the present iteration and the groups of exposure settings selected in all previous iterations is below the predefined threshold.

5. A method according to claim 4, wherein for each iteration, the selected group of exposure settings is used to capture a set of imaging data with the imaging system;
wherein for each iteration from the second iteration onwards, the set of image data captured in the previous iteration is used in determining the candidate groups of exposure settings for the present iteration.

6. A method according to claim 5, wherein the step of determining whether or not respective pixels would be well-exposed pixels if using a candidate group of exposure settings comprises determining a probability that the respective pixels will be well exposed, the probability being determined based on the amount of signal received in those pixels in previous iterations of the method.

7. A method according to claim 1, wherein the step of identifying one or more candidate groups of exposure settings comprises determining, for one or more pixels of the image sensor, a range of exposure times for which the pixel is likely to be a well exposed pixel.

8. A method according to claim 1, wherein the value of the quality parameter associated with a pixel is determined based on the amount of ambient light in the scene being imaged.

9. A method according to claim 1, wherein each group of exposure settings comprise one or more of:
- the size of an aperture stop in the path between the object and the sensor;
- an intensity of light used to illuminate the object; and
- the strength of an ND filter placed in the light path between the object and the sensor.

10. A method according to claim 1, wherein the image data in each set of image data comprises one or more 2D images of the object as captured on the sensor.

11. A method according to claim 1, wherein the imaging system is one that uses structured illumination to obtain each set of image data.

12. A method for generating a 3D image of one or more objects using an imaging system comprising an image sensor, the method comprising:
capturing, on the image sensor, one or more sets of image data using respective groups of exposure settings, the sets of image data being such as to allow the generation of one or more 3D point clouds defining the three-dimensional coordinates of points on the surface(s) of the one or more objects, each group of exposure settings including an exposure time to be used when capturing a respective one of the sets of image data; and
constructing a 3D point cloud using the data from one or more of the captured sets of image data;
wherein the exposure settings used for capturing each set of image data are determined using a method according to claim 1.

13. A computer readable storage medium comprising computer executable code that when executed by a computer will cause the computer to carry out a method according to claim 1.

14. An imaging system for performing a 3D image acquisition process by capturing one or more sets of image data with one or more groups of exposure settings, the one or more sets of image data being such as to allow the generation of one or more 3D point clouds defining the three-dimensional coordinates of points on the surface of one or more objects being imaged, the imaging system comprising an image sensor for capturing the one or more sets of image data, the imaging system being configured to determine the one or more groups of exposure settings to use for the 3D image acquisition process by carrying out a method in accordance with claim 1.

* * * * *